US012711108B2

(12) United States Patent
Mears

(10) Patent No.: US 12,711,108 B2
(45) Date of Patent: Aug. 18, 2026

(54) COMPACT REPRESENTATION OF OBJECT STORE WORKLOADS

(71) Applicant: NetApp, Inc., San Jose, CA (US)

(72) Inventor: Morgan Mears, Raleigh, NC (US)

(73) Assignee: NetApp, Inc., San Jose, CA (US)

( * ) Notice: Subject to any disclaimer, the term of this patent is extended or adjusted under 35 U.S.C. 154(b) by 513 days.

(21) Appl. No.: 17/653,011

(22) Filed: Mar. 1, 2022

(65) Prior Publication Data

US 2023/0281170 A1 Sep. 7, 2023

(51) Int. Cl.
*G06F 16/21* (2019.01)

(52) U.S. Cl.
CPC .................................... *G06F 16/21* (2019.01)

(58) Field of Classification Search
CPC ....................................................... G06F 16/21
See application file for complete search history.

(56) References Cited

U.S. PATENT DOCUMENTS

2011/0246518 A1* 10/2011 Mehrotra .............. H04L 67/568 707/E17.032
2013/0145349 A1* 6/2013 Basak ................. G06F 11/3495 717/121
2014/0310290 A1* 10/2014 Huang ................ G06F 11/3072 707/755
2017/0091327 A1* 3/2017 Bostic ................... G06F 16/252
2018/0181895 A1* 6/2018 Singh ............... G06Q 10/06315
2021/0342712 A1* 11/2021 Ferreira ................... G06N 5/01

* cited by examiner

*Primary Examiner* — Charles D Adams
(74) *Attorney, Agent, or Firm* — Jaffery Watson Hamilton & DeSanctis LLP

(57) ABSTRACT

Systems and techniques that facilitate compact representation of object store workloads are provided. In various embodiments, a system can access a stream of object-storage operation requests associated with an object store. In various aspects, the system can identify a set of repeating object-storage operation sequences, based on the stream of object-storage operation requests. In various instances, the system can generate a set of distribution ensembles that quantify variation of first attributes associated with respective ones of the set of repeating object-storage operation sequences. In various cases, the stream of object-storage operation requests can be considered as fully and/or bulkily representing the workload experienced by the object store. In contrast, the set of distribution ensembles can be considered as compactly representing the workload experienced by the object store (e.g., the set of distribution ensembles can take up far less memory space than the stream of object-storage operation requests).

18 Claims, 18 Drawing Sheets

1500

ACCESSING, BY A DEVICE OPERATIVELY COUPLED TO A PROCESSOR, A STREAM OF OBJECT-STORAGE OPERATION REQUESTS ASSOCIATED WITH AN OBJECT STORE

1502

IDENTIFYING, BY THE DEVICE, A SET OF REPEATING OBJECT-STORAGE OPERATION SEQUENCES WITHIN THE STREAM OF OBJECT-STORAGE OPERATION REQUESTS

1504

GENERATING, BY THE DEVICE, A SET OF DISTRIBUTION ENSEMBLES THAT DESCRIBE HOW FIRST ATTRIBUTES ASSOCIATED WITH RESPECTIVE ONES OF THE SET OF REPEATING OBJECT-STORAGE OPERATION SEQUENCES VARY, WHEREIN THE SET OF DISTRIBUTION ENSEMBLES COLLECTIVELY REPRESENT A WORKLOAD OF THE OBJECT STORE

1506

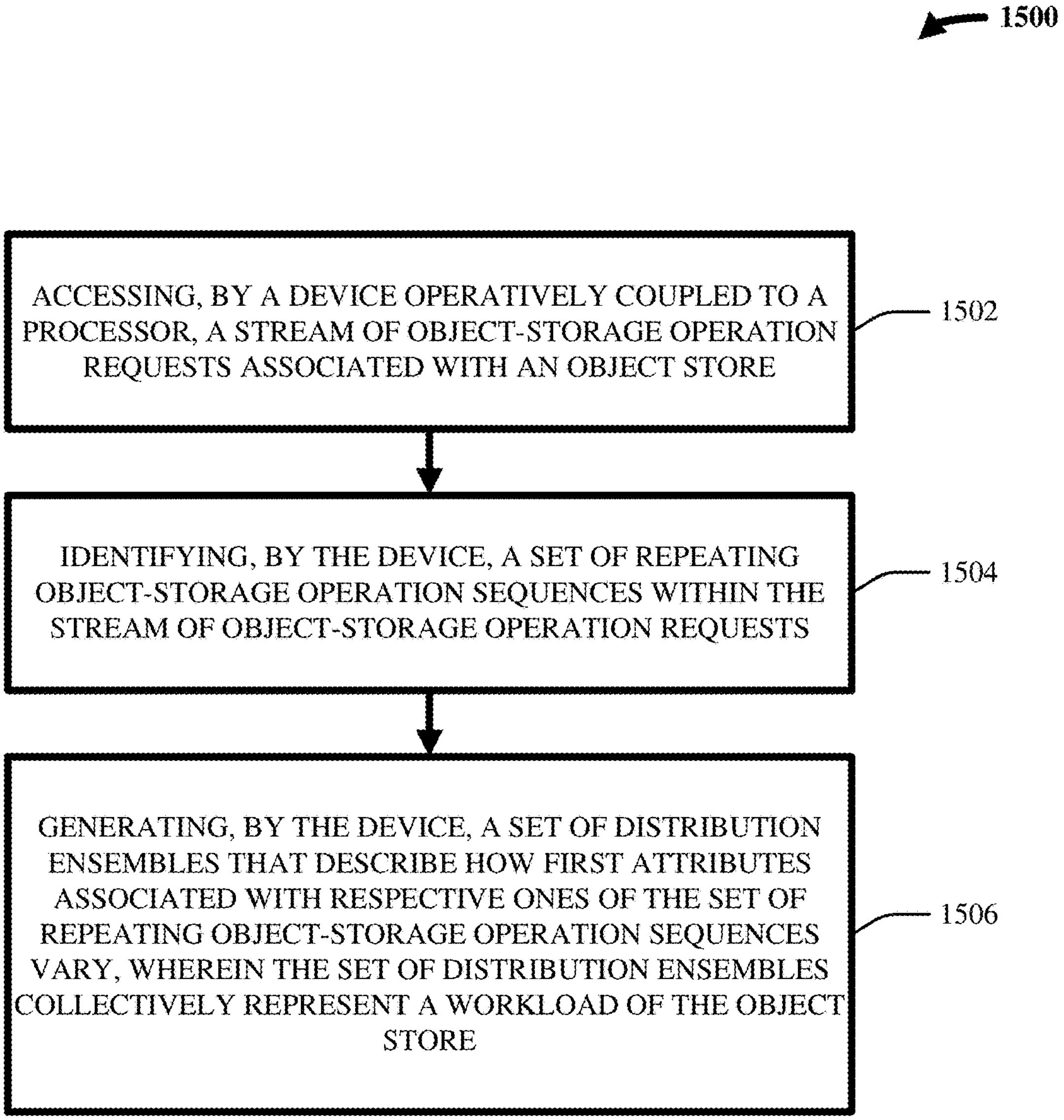

COMPACT REPRESENTATION OF OBJECT STORE WORKLOADS

TECHNICAL FIELD

The subject disclosure relates generally to object stores, and more specifically to facilitating compact representation of object store workloads.

BACKGROUND

An object store can sequentially receive, from one or more client devices, requests to perform various object-storage operations. Such requests can represent the full workload of the object store. When initially designed, the object store can be configured to handle a certain type and/or volume of workload. Over time, the actual workload which the object store is tasked with handling can often become different from that which the object store was initially designed to handle. In such cases, it can be desirable to reconfigure the object store so as to allow the object store to appropriately handle its actual workload. In order to determine whether and/or how to reconfigure the object store, it can be necessary to quantify and/or otherwise express the current workload of the object store. Existing techniques for quantifying and/or expressing the workload of the object store involve full operation tracing. Unfortunately, due to the expansive size of modern object stores and due to the massive volume of requests received by modern object stores, such full operation tracing is excessively bulky, time-consuming, and memory-consuming.

Accordingly, systems and/or techniques that can address one or more of the above-described technical problems can be desirable.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatus and/or computer program products that can facilitate compact representation of object store workloads are described.

According to one or more embodiments, a system is provided. The system can include a memory that can store computer-executable components. The system can further include a processor that can be operably coupled to the memory and that can execute the computer-executable components stored in the memory. In various embodiments, the computer-executable components can include an access component that can access a stream of object-storage operation requests associated with an object store. In various aspects, the computer-executable components can further include a sequence component that can identify a set of repeating object-storage operation sequences, based on the stream of object-storage operation requests. In various instances, the computer-executable components can further include a model component that can generate a set of distribution ensembles that quantify variation of first attributes associated with respective ones of the set of repeating object-storage operation sequences.

According to one or more embodiments, the above-described system can be implemented as a computer-implemented method and/or computer program product.

DESCRIPTION OF THE DRAWINGS

FIG. 15 illustrates a flow diagram of an example, non-limiting computer-implemented method that facilitates compact representation of object store workloads in accordance with one or more embodiments described herein.

DETAILED DESCRIPTION

Figure 1:
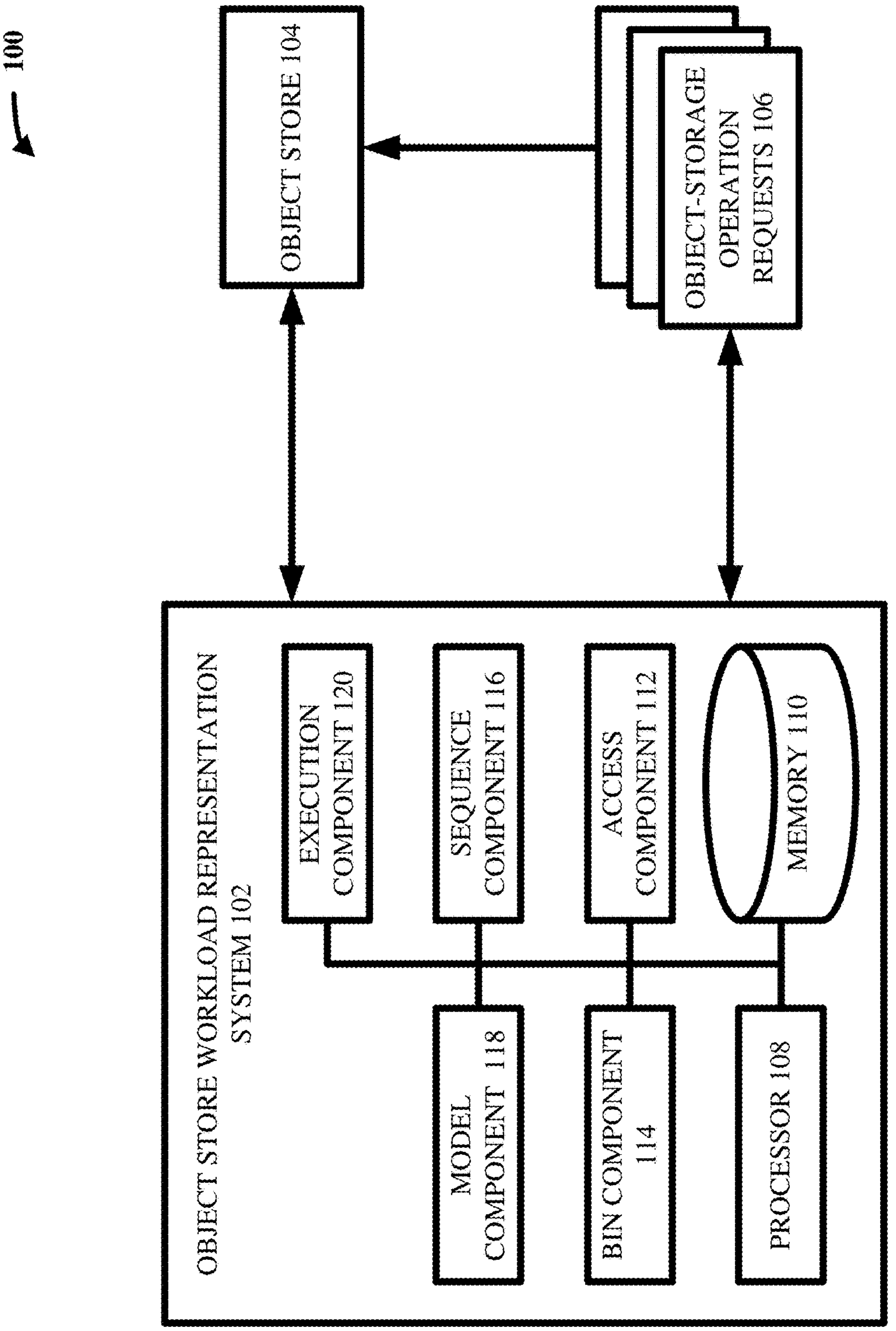
FIG. 1 illustrates a block diagram of an example, non-limiting system that facilitates compact representation of object store workloads in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

An object store (e.g., an object-oriented database, such as a cloud storage platform) can sequentially receive, from one or more client devices (e.g., from one or more client laptop computers, client desktop computers, client smart phones), requests to perform various object-storage operations (e.g., PUT operations, HEAD operations, GET operations, DELETE operations). Such requests can be considered as collectively being and/or otherwise collectively representing the full workload of the object store.

When initially designed, the object store can be structured and/or otherwise configured to handle a certain type and/or volume of workload. Over time, the actual workload which the object store experiences can often become significantly different from that which the object store was initially designed to handle. For example, as time progresses, clients can begin to utilize the object store in unintended ways, such as by requesting more than an intended number of operations, such as by requesting unintended types of operations, such as by requesting operations at un unintended speed/rate, and/or such as by requesting operations to be performed on objects of unintended sizes. In such cases, it can be desirable to reconfigure (e.g., redesign, restructure, update) the object store so as to allow the object store to appropriately handle its actual workload. In order to determine whether and/or how to reconfigure the object store, it can be necessary to first quantify and/or otherwise express the current workload of the object store.

Existing techniques for quantifying and/or expressing the workload of an object store involve full operation tracing. That is, such existing techniques log, record, and/or track the receipt and/or processing of every operation request that is transmitted to the object store by a client device. Unfortunately, due to the expansive size of modern object stores (e.g., storing hundreds of billions of objects, utilizing tens of thousands of terabytes of memory space) and due to the massive volume of requests received by modern object stores (e.g., thousands of requests per second), such full operation tracing is excessively bulky, time-consuming, and memory-consuming (e.g., the voluminous logs generated by full operation tracing are not easily workable, interpretable, and/or analyzable). Regrettably, existing techniques are not able to quantify, express, and/or otherwise represent an object store workload in a more workable and/or compact fashion.

Systems and/or techniques that can address one or more of these technical problems can thus be desirable.

Various embodiments of the invention can address one or more of these technical problems. Specifically, various embodiments described herein can provide systems and/or techniques that can facilitate compact representation of object store workloads.

As mentioned above, existing techniques for quantifying and/or representing object store workloads merely record and/or log all object-storage operation requests that are received by an object store, via full operation tracing. Unfortunately, the records/logs produced by such full operation tracing are massive in terms of size and/or memory-consumption, are seemingly chaotic, and thus are not amendable to interpretation and/or analysis. For example, even though a software engineer might review the massive records/logs produced by full tracing of an object store, it can nevertheless be extremely difficult for the software engineer to correctly determine whether or not reconfiguration of the object store is warranted. In other words, the records/logs yielded by such tracing can be so large and seemingly disorganized as to be nearly uninterpretable to the software engineer. Indeed, this explains why such software engineers often rely instead upon "guesstimates" and/or "gut intuition" when determining whether an object store should be reconfigured.

Fortunately, the inventors of various embodiments described herein devised a technique by which such object-storage operation requests can be represented in a more compact (e.g., in a less memory-consuming) format. Specifically, the present inventors recognized that various clients of an object store often repeatedly and/or repetitively utilize various sequences of object-storage operation requests. That is, the present inventors realized that a voluminous and seemingly chaotic stream of object-storage operation requests that are sequentially received by an object store can actually be sorted into a less voluminous and less chaotic set of repeating object-storage operation sequences (e.g., each sequence including two or more operation requests performed on a same object in a given chronological order). Moreover, the present inventors further realized that such set of repeating object-storage operation sequences can be represented in an even more condensed and organized fashion by frequency distributions and/or probability density distributions of sequence attributes. Accordingly, the present inventors developed various embodiments described herein, which can identify repeating object-storage operation sequences based on a stream of object-storage operation requests received by an object store, and which can compute attribute distributions based on such repeating object-storage operation sequences. In various cases, the computed distributions can consume far less memory-space than the raw stream of object-storage operation requests while still conveying important information about the workload encountered by the object store. Accordingly, the computed distributions can be considered as compactly representing the workload of the object store. Therefore, decisions regarding the object store (e.g., whether or not to reconfigure) can be based upon such computed distributions rather than upon the raw stream of object-storage operation requests.

Various embodiments described herein can be considered as a computerized tool for facilitating compact representation of object store workloads. In various aspects, such a computerized tool can comprise an access component, a bin component, a sequence component, a model component, and/or an execution component.

In various embodiments, there can be an object store. In various aspects, the object store can be any suitable object-oriented database as desired (e.g., an object-oriented cloud database, such as S3). In various instances, the object store can electronically receive, from any suitable number of computing clients, a stream of object-storage operation requests. In various cases, each object-storage operation request can have a timestamp indicating a time and/or date on which the object-storage operation request was made, received, and/or performed, a tenant identifier indicating which tenant (e.g., which computing client) made and/or transmitted the object-storage operation request, a bucket identifier indicating in which bucket (e.g., in which partition) of the object store the object-storage operation request is to be performed, and/or an object identifier indicating on which specific object in the identified bucket the object-storage operation request is to be performed. In various aspects, different object-storage operation requests can have the same and/or different tenant identifiers as each other (e.g., a given tenant can make multiple, distinct requests). In various instances, different object-storage operation requests can have the same and/or different bucket identifiers as each other (e.g., multiple, distinct requests can pertain to the same bucket). In various cases, different object-storage operation requests can have the same and/or different object identifiers as each other (e.g., multiple, distinct requests can pertain to the same object). However, in various aspects, different object-storage operation requests can have different timestamps as each other (e.g., no two requests are received/performed at the same time). Accordingly, notwithstanding that the object store can receive thousands of object-storage operation requests per second, the object store can be considered as receiving the stream of object-storage operation requests in sequential and/or chronological fashion (e.g., one request at a time).

Although the herein disclosure mainly describes the stream of object-storage operation requests as being received sequentially (e.g., one at a time, each request having a unique timestamp), this is a mere non-limiting example for ease of explanation. Those having ordinary skill in the art will appreciate that, in various cases, the herein-described teachings can be applied and/or extrapolated to situations where different object-storage operation requests can have the same timestamp as each other (e.g., temporally parallel requests).

In various embodiments, the access component of the computerized tool can electronically receive and/or access the stream of object-storage operation requests. In some aspects, the access component can electronically retrieve the stream of object-storage operation requests from any suitable database and/or data structure as desired (e.g., graph data structure, relational data structure, hybrid data structure), whether remote from and/or local to the access component. For example, in some cases, the access component can retrieve and/or access the stream of object-storage operation requests from the object store itself. In other aspects, however, the access component can electronically intercept the stream of object-storage operation requests as they are transmitted to the object store. In any case, the access component can electronically obtain and/or access the stream of object-storage operation requests, so that other components of the computerized tool can electronically interact with (e.g., read, write, edit, manipulate) the stream of object-storage operation requests.

In various embodiments, the bin component of the computerized tool can electronically segment and/or sort the stream of object-storage operation requests into a set of bins. In various aspects, the set of bins can include any suitable number of bins. In various instances, a bin can be considered as a collection, group, and/or subset of object-storage operation requests that have corresponding and/or shared attributes as each other. For example, a particular bin can be defined by a particular time interval, a particular bucket identifier, and/or a particular tenant identifier. In such case, every object-storage operation request in the stream that has a timestamp falling within the particular time interval, that has a bucket identifier matching the particular bucket identifier, and/or that has a tenant identifier matching the particular tenant identifier can be assigned to the particular bin. In this way, the stream of object-storage operation requests can be separated out into the set of bins, such that any given bin contains object-storage operation requests that are similar to each other (e.g., same bucket as each other, same tenant as each other, similar timestamps as each other). However, note that, in some cases, different object-storage operation requests can operate on different objects (e.g., can have different object identifiers), notwithstanding being assigned to the same bin as each other. In various aspects, the binning facilitated by the bin component can be considered as a first step in reducing the apparent chaos and/or disorganization exhibited by the stream of object-storage operation requests.

In various embodiments, the sequence component of the computerized tool can electronically identify, in bin-wise fashion, a set of repeating object-storage operation sequences based on the set of object-storage operation requests. More specifically, for any given bin in the set of bins, the given bin can contain any suitable number of object-storage operation requests. Note that, because the object store functions by receiving individual object-storage operation requests rather than by receiving enumerated sequences of object-storage operation requests, it can be unknown which ground-truth repeating object-storage operation sequences exist within the given bin. Thus, in various aspects, the sequence component can be considered as attempting to identify what it believes are repeating sequences of the object-storage operation requests that belong to the given bin.

In particular, the sequence component can be able to identify and/or track a maximum of s distinct repeating object-storage operation sequences within the given bin, for any suitable positive integer s (e.g., s can be based on an amount of memory space that has been allotted to the given bin). Furthermore, the sequence component can start out as identifying and/or tracking zero repeating object-storage operation sequences in the given bin. In various instances, the sequence component can iterate through each object-storage operation request in the given bin in order of timestamp from earliest (e.g., received least recently) to latest (e.g., received most recently).

For the particular object-storage operation request that is currently being considered by the sequence component, the sequence component can determine whether there already exists a repeating object-storage operation sequence that is currently being identified/tracked for the given bin and that operates on the same object as the particular object-storage operation request. As those having ordinary skill in the art will appreciate, the sequence component can accomplish this determination via object-identifier regex matching.

If the sequence component is currently identifying/tracking a repeating object-storage operation sequence that operates on the same object as the particular object-storage operation request (e.g., if the sequence component has previously come across a request in the given bin that operates on the same object as the particular object-storage operation request), then the sequence component can append the particular object-storage operation request to that existing repeating object-storage operation sequence (e.g., the particular object-storage operation request can now be considered as the most recent operation in that already-existing sequence). The sequence component can then iterate to a next object-storage operation request in the given bin.

On the other hand, if the sequence component is not currently identifying/tracking a repeating object-storage operation sequence that operates on the same object as the particular object-storage operation request (e.g., if the sequence component has not yet previously come across a request in the given bin that operates on the same object as the particular object-storage operation request), then the sequence component can determine whether or not there exists sufficient memory space to track a new repeating object-storage operation sequence.

If there does exist sufficient memory space (e.g., if the sequence component is currently identifying/tracking fewer than s sequences for the given bin), then the sequence component can begin identifying/tracking a new repeating object-storage operation sequence, where the particular object-storage operation request can be the first operation in such new sequence. The sequence component can then iterate to a next object-storage operation request in the given bin.

In contrast, if there does not exist sufficient memory space (e.g., if the sequence component is currently identifying/tracking s sequences for the given bin), then the sequence component can select and/or choose any one of the repeating object-storage operation sequences (e.g., any of the s already-existing sequences) that are currently being identified/tracked for the given bin and which the sequence component believes/infers is most likely to be complete. In some cases, the sequence component can select/choose randomly from among such existing sequences (e.g., a randomly chosen sequence can be deemed as most likely to be complete). In other cases, the sequence component can select/choose from among such existing sequences based on sequence length (e.g., a longest sequence and/or a sequence having the largest number of operations can be deemed as most likely to be complete). In still other cases, the sequence component can select/choose from among such existing sequences based on sequence age (e.g., an oldest sequence and/or a sequence that the sequence component has been identifying/tracking for a longest amount of time can be deemed as most likely to be complete). In yet other cases, the sequence component can select/choose from among such existing sequences based on time that has elapsed since being updated/lengthened (e.g., a sequence that has not been updated, lengthened, and/or otherwise added-to by the sequence component in a longest amount of time can be deemed as the most likely to be complete). In any case, the sequence component can select/choose one already-existing repeating object-storage operation sequence for the given bin.

In various aspects, the sequence component can transmit such selected/chosen repeating object-storage operation sequence to the model component of the computerized tool, can cease identifying/tracking such selected/chosen repeating object-storage operation sequence (e.g., which can free up some memory space for identifying/tracking sequences for the given bin), and can begin identifying/tracking a new repeating object-storage operation sequence, where the particular object-storage operation request can be the first operation in such new sequence (e.g., the new sequence can be identified/tracked in the memory space that was freed up by removal of the selected/chosen sequence). The sequence component can then iterate to a next object-storage operation request in the given bin.

Those having ordinary skill in the art will appreciate that the above-described technique for identifying/tracking repeating object-storage operation sequences in the given bin is merely a non-limiting example. In various other cases, the sequence component can implement any suitable pattern recognition techniques for identifying/tracking such sequences in the given bin.

In various aspects, the sequence component can iterate through each object-storage operation request of each bin, with the result being that a set of repeating object-storage operation sequences are ultimately identified and/or sent/transmitted from the sequence component to the model component. In various instances, the sequence identification/selection facilitated by the sequence component can be considered as a second step in reducing the apparent chaos and/or disorganization exhibited by the stream of object-storage operation requests.

In various embodiments, the model component of the computerized tool can electronically generate, in bin-wise fashion, a set of distribution ensembles based on the set of repeating object-storage operation sequences that are identified, selected, chosen, and/or otherwise provided by the sequence component. In various aspects, a distribution ensemble can include any suitable number of frequency distributions and/or probability density distributions that represent variation in various attributes of various repeating object-storage operation sequences. For example, a distribution ensemble can include a first distribution (e.g., frequency and/or probability density distribution defined by a mean, median, variance, standard deviation, and/or cardinality) that describes variation of object sizes (e.g., measured in bytes, kilobytes, megabytes, gigabytes, terabytes) associated with various repeating object-storage operation sequences (e.g., each sequence can operate on a particular object, and thus each sequence can be considered as having an associated object size). As another example, the distribution ensemble can further include one or more second distributions (e.g., frequency and/or probability density distributions defined by means, medians, variances, standard deviations, and/or cardinalities) that describe variation of operation interarrival times of various repeating object-storage operation sequences (e.g., interarrival times can be the times that elapse between the individual operation requests of a sequence). In various cases, the model component can electronically generate any suitable number of distribution ensembles for each bin identified by the bin component.

In particular, for any given bin, the model component can be able to identify and/or track a maximum of t distinct distribution ensembles for the given bin, for any suitable positive integer t (e.g., t can be based on an amount of memory space that has been allotted to the given bin). Furthermore, the model component can start out as identifying and/or tracking zero distribution ensembles for the given bin. In various instances, the sequence component can transmit any suitable number of selected/chosen/identified repeating object-storage operation sequences to the model component for the given bin as described above, and the model component can iterate through each of such repeating object-storage operation sequences.

For the particular repeating object-storage operation sequence that is currently being considered by the model component, the model component can determine whether there already exists a distribution ensemble that is currently being identified/tracked for the given bin and into which the particular repeating object-storage operation sequence fits sufficiently closely. In various aspects, whether the particular repeating object-storage operation sequence fits sufficiently closely into a distribution ensemble can be determined in any suitable fashion as desired.

For example, in some cases, the particular repeating object-storage operation sequence can be deemed to fit sufficiently closely into a distribution ensemble when the attributes (e.g., object size, interarrival times) of the particular repeating object-storage operation sequence are within any suitable threshold distances of the attribute means (e.g., average object size, average interarrival times) exhibited by the distribution ensemble. Conversely, the particular repeating object-storage operation sequence can be deemed to not fit sufficiently closely into the distribution ensemble when the attributes (e.g., object size, interarrival times) of the particular repeating object-storage operation sequence are farther than those threshold distances from the attribute means (e.g., average object size, average interarrival times) exhibited by the distribution ensemble.

As another example, in various instances, the particular repeating object-storage operation sequence can be deemed to fit sufficiently closely into a distribution ensemble when the attributes (e.g., object size, interarrival times) of the particular repeating object-storage operation sequence are within any suitable threshold distances of the attribute medians (e.g., median object size, median interarrival times) exhibited by the distribution ensemble. Conversely, the particular repeating object-storage operation sequence can be deemed to not fit sufficiently closely into a distribution ensemble when the attributes (e.g., object size, interarrival times) of the particular repeating object-storage operation sequence are farther than those threshold distances from the attribute medians (e.g., median object size, median interarrival times) exhibited by the distribution ensemble.

As yet another example, in various aspects, the particular repeating object-storage operation sequence can be deemed to fit sufficiently closely into a distribution ensemble when the probabilities that the attributes (e.g., object size, interarrival times) of the particular repeating object-storage operation sequence came from the distribution ensemble are at least at any suitable threshold levels. Conversely, the particular repeating object-storage operation sequence can be deemed to not fit sufficiently closely into the distribution ensemble when the probabilities that the attributes (e.g., object size, interarrival times) of the particular repeating object-storage operation sequence came from the distribution ensemble are lesser than those threshold levels.

In any case, if the model component deems that the particular repeating object-storage operation sequence fits sufficiently closely within an existing distribution ensemble, then the model component can update such existing distribution ensemble based on the particular repeating object-storage operation sequence (e.g., the particular repeating object-storage operation sequence can change the means, medians, variances, standard deviations, and/or cardinalities of such existing distribution ensemble). The model component can then iterate to a next repeating object-storage operation sequence for the given bin.

On the other hand, if the model component deems that the particular repeating object-storage operation sequence does not fit sufficiently closely within an existing distribution ensemble, then the model component can determine whether or not there exists sufficient memory space to track a new distribution ensemble for the given bin.

If there does exist sufficient memory space (e.g., if the model component is currently identifying/tracking fewer than t distribution ensembles for the given bin), then the model component can begin identifying/tracking a new distribution ensemble based on the particular repeating object-storage operation sequence (e.g., the particular repeating object-storage operation sequence can be the first sequence added to such new distribution ensemble). The model component can then iterate to a next repeating object-storage operation sequence for the given bin.

In contrast, if there does not exist sufficient memory space (e.g., if the model component is currently identifying/tracking t distribution ensembles for the given bin), then the model component can select and/or choose any two of the existing distribution ensembles (e.g., any two of the t already-existing ensembles) that are currently being identified/tracked for the given bin and which the model component believes/infers are most similar to each other. In some cases, the model component can determine which two existing distribution ensembles are most similar by applying any suitable statistical hypothesis tests (e.g., z-tests, t-tests, Kolmogorov-Smirnov tests) to every pair of existing distribution ensembles associated with the given bin, and the pair of existing distribution ensembles for which statistical hypothesis tests yield highest p-values can be determined to be the most similar pair of existing distribution ensembles.

For instance, consider a first distribution ensemble that includes a first object size distribution and u first interarrival time distributions, for any suitable positive integer u. Also, consider a second distribution ensemble that includes a second object size distribution and u second interarrival time distributions. In various aspects, the first distribution ensemble and the second distribution ensemble can be compared via statistical hypothesis tests as follows: a first statistical hypothesis test can be performed between the first object size distribution and the second object size distribution, which can yield a first computed p-value; moreover, a total of u second statistical hypothesis tests can be performed between respective ones of the u first interarrival time distributions and the u second interarrival time distributions, which can yield u second computed p-values. If the first computed p-value and if the u second computed p-values are all above a statistically significant threshold (e.g., are all greater than 0.05), then it can be concluded that the first distribution ensemble and the second distribution ensemble are sufficiently similar to each other (e.g., it cannot be concluded that the first distribution ensemble and the second distribution ensemble are statistically significantly different from each other). However, if the first computed p-value or if any of the u second computed p-values falls below the statistically significant threshold (e.g., is lesser than 0.05), then it can be concluded that the first distribution ensemble and the second distribution ensemble are not sufficiently similar to each other (e.g., it can be concluded that the first distribution ensemble and the second distribution ensemble are statistically significantly different from each other). In this way, the model component can compute p-values for each pair of already-existing distribution ensembles that are associated with the given bin, and the pair of already-existing distribution ensembles that have the numerically highest p-values can be considered as being the most similar to each other.

In any case, the model component can select/choose two already-existing distribution ensembles for the given bin.

In various aspects, the model component can merge the two selected/chosen distribution ensembles together, thereby yielding one resultant distribution ensemble. In various instances, such merging can be accomplished as follows. Consider a first distribution ensemble that has a cardinality of v for any suitable positive integer v. That is, the first distribution ensemble can have been computed based on a set of v first repeating object-storage operation sequences. Furthermore, consider a second distribution ensemble that has a cardinality of w for any suitable positive integer w. That is, the second distribution ensemble can have been computed based on a set of w second repeating object-storage operation sequences. In various aspects, the first distribution ensemble and the second distribution ensemble can be merged to yield a resultant distribution ensemble having a cardinality of v+w. That is, the v first repeating object-storage operation sequences and the w second repeating object-storage operation sequences can be combined into one set of v+w repeating object-storage operation sequences, and the resultant distribution ensemble can be computed based on such set of v+w repeating object-storage operation sequences.

In any case, the act of merging two already-existing distribution ensembles can free up memory space, and the model component can use such freed-up memory space to identify/track a new distribution ensemble based on the particular repeating object-storage operation sequence (e.g., the particular repeating object-storage operation sequence can be the first sequence added to such new distribution ensemble). The model component can then iterate to a next repeating object-storage operation sequence for the given bin.

In various embodiments, the model component can generate distribution ensembles in this fashion for every bin in the set of bins, thereby yielding a collective set of distribution ensembles. In various instances, the distribution ensemble generation facilitated by the model component can be considered as a third step in reducing the apparent chaos and/or disorganization of the stream of object-storage operation requests.

In various aspects, the collective set of distribution ensembles generated by the model component can convey important information regarding the workload of the object store, while simultaneously consuming far less memory space than the raw stream of object-storage operation requests received by the object store. After all, the raw stream of object-storage operation requests can be massively voluminous and chaotic; such volume and chaos can be reduced by segmenting the raw stream of object-storage operation requests into the set of bins (e.g., there can be fewer bins than operation requests), such volume and chaos can be further reduced by identifying repeating sequences of operation requests within each bin (e.g., there can be fewer repeating sequences than operation requests in each bin); and such volume and chaos can be even further reduced by computing distribution ensembles based on such repeating sequences (e.g., there can be fewer distribution ensembles than repeating sequences in each bin). Accordingly, the collective set of distribution ensembles can be considered as a compact representation and/or a lossy compression of the workload experienced by the object store. In still other words, the collective set of distribution ensembles can be considered as a more easily workable, more easily interpretable, and/or more easily analyzable version and/or format of the raw stream of object-storage operation requests.

In various embodiments, the execution component of the computerized tool can electronically initiate any suitable electronic actions based on the collective set of distribution ensembles. For example, in some cases, the execution component can electronically compare (e.g., via any suitable statistical hypothesis tests) the collective set of distribution ensembles with any suitable threshold distributions (e.g., the threshold distributions can define and/or represent which type of workload the object store was initially designed to handle). If the execution component determines that the collective set of distribution ensembles satisfy the threshold distributions, then the execution component can conclude that the actual workload of the object store is sufficiently similar to the originally intended workload of the object store, such that reconfiguration of the object store is not warranted. Accordingly, the execution component can electronically transmit to any suitable computing device, and/or can electronically render on any suitable computer display/screen/monitor, a recommendation that indicates that the object store should not undergo reconfiguration. On the other hand, if the execution component determines that the collective set of distribution ensembles fail to satisfy the threshold distributions, then the execution component can conclude that the actual workload of the object store is not sufficiently similar to the originally intended workload of the object store, such that reconfiguration of the object store is warranted. Accordingly, the execution component can electronically transmit to any suitable computing device, and/or can electronically render on any suitable computer display/screen/monitor, a recommendation that indicates that the object store should undergo reconfiguration. In some cases, the execution component can even schedule, initiate, and/or facilitate reconfiguration of the object store when such reconfiguration is recommended.

As another example, the execution component can electronically generate a synthetic workload (e.g., a synthetic stream of object-storage operation requests) that matches and/or that is otherwise based on the collective set of distribution ensembles. Accordingly, the execution component can expose the object store to such synthetic workload (e.g., in a laboratory setting), so as to facilitate troubleshooting of the object store.

Accordingly, various embodiments described herein can include a computerized tool that can electronically generate a compact and/or more easily interpretable representation of the workload of an object store, and such compact and/or more easily interpretable representation can be leveraged to facilitate reconfiguration and/or troubleshooting of the object store.

Various embodiments of the invention can be employed to use hardware and/or software to solve problems that are highly technical in nature (e.g., to facilitate compact representation of object store workloads), that are not abstract and that cannot be performed as a set of mental acts by a human. Further, some of the processes performed can be performed by a specialized computer (e.g., object-oriented database, frequency and/or probability density distribution generators). In various aspects, some defined tasks associated with various embodiments of the invention can include: accessing a stream of object-storage operation requests of an object store; segmenting the stream of object-storage operation requests into a set of bins, based on first attributes (e.g., timestamp, bucket identifier, tenant identifier) of the stream of object-storage operation requests; identifying, in bin-wise fashion, a set of repeating object-storage operation sequences within the stream of object-storage operation requests; and generating, in bin-wise fashion, a set of distribution ensembles conveying how second attributes (e.g., object size, interarrival times) of the set of repeating object-storage operation sequences vary, wherein the set of distribution ensembles collectively represent a workload of the object store, and wherein the set of distribution ensembles take up less memory than the stream of object-storage operation requests.

Neither the human mind nor a human with pen and paper can electronically access operation requests received by an object store, electronically separate such operation requests into bins based on various attributes (e.g., timestamp, bucket identifier, tenant identifier), electronically search for repeating sequences among the operation requests of each bin, and/or electronically generate frequency and/or probability density distributions that describe such repeating sequences.

Indeed, object stores (e.g., a cloud storage platform, such as S3) are specific combinations of computer-executable hardware and computer-executable software that cannot be implemented in any way without computers. Accordingly, a computerized tool that can electronically convert a raw workload of an object store into a more compact and thus more easily analyzable format is likewise a specific combination of computer-executable hardware and/or computer-executable software that cannot be implemented in any sensible, practical, and/or reasonable way outside of a computing environment.

In various instances, one or more embodiments described herein can be integrated into a practical application. Indeed, as mentioned above, to determine whether or not an object store should be reconfigured/redesigned, it can first be necessary to quantify, convey, and/or otherwise represent the workload that is experienced by the object store. As explained above, existing techniques for quantifying, conveying, and/or representing the workload of the object store involve full operation tracing (e.g., recording/logging/tracking the receipt and processing of all operation requests that are handled by the object store). Unfortunately, such full tracing produces records/logs that are massively voluminous and seemingly chaotic. Indeed, even when software engineers review such records/logs, the software engineers are often left with no choice other than to make decisions about an object store based on "guesstimates" and/or "gut intuitions." In stark contrast, various embodiments of the invention, which can take the form of systems and/or computer-implemented methods, can be considered as a computerized tool that can electronically convert a raw workload of an object store into a more compact (e.g., less memory-consuming) format. As explained herein, the computerized tool can accomplish this by accessing a stream of operation requests encountered by the object store, binning the stream of operation requests, identifying in bin-wise fashion repeating sequences of such operation requests, and generating in bin-wise fashion distribution ensembles that capture/convey various attributes (e.g., object size distributions, interarrival time distributions) of such repeating sequences. As explained herein, such distribution ensembles can be considered as a lossy compression (e.g., a compact representation) of the stream of operation requests. Accordingly, the distribution ensembles can be analyzed and/or interpreted far more easily than the raw stream of operation requests. A computerized tool that can convert a raw workload of an object store into such a compact representation addresses the shortcomings of various existing techniques for representing/quantifying workloads of object stores. Thus, such a computerized tool constitutes a tangible and concrete technical improvement in the field of object stores, and certainly qualifies as a useful and practical application of computers.

Furthermore, various embodiments described herein can control real-world, tangible devices based on the disclosed teachings. For example, in various aspects, various embodiments described herein can generate a compact representation of a workload of a real-world object store (e.g., a real-world cloud database, like S3) and can determine whether or not to reconfigure the real-world object store based on such compact representation. In some cases, various embodiments described herein can even actively troubleshoot the real-world object store based on such compact representation (e.g., by generating a synthetic workload that matches and/or fits the compact representation and by subjecting/exposing the real-world object store to such synthetic workload).

It should be appreciated that the figures and the herein disclosure describe non-limiting examples of various embodiments of the invention, and it should further be appreciated that the figures are not necessarily drawn to scale.

FIG. 1 illustrates a block diagram of an example, non-limiting system 100 that can facilitate compact representation of object store workloads in accordance with one or more embodiments described herein. As shown, an object store workload representation system 102 can be electronically integrated, via any suitable wired and/or wireless electronic connections, with an object store 104 and/or with a set of object-storage operation requests 106.

In various embodiments, the object store 104 can be any suitable electronic and/or computerized database that exhibits an object-oriented architecture. As a non-limiting example, the object store 104 can be a cloud storage platform, such as S3.

In various embodiments, the object store 104 can electronically receive, from any suitable client devices (not shown), the set of object-storage operation requests 106. In various aspects, the set of object-storage operation requests 106 can include any suitable number of object-storage operation requests. In various instances, an object-storage operation request can be any suitable piece of electronic data (e.g., having any suitable format and/or dimensionality) that instructs and/or commands the object store 104 to perform some object-storage operation. As some non-limiting examples, an object-storage operation can be a PUT operation, a HEAD operation, a GET operation, and/or a DELETE operation. In various cases, the set of object-storage operation requests 106 is further described with respect to FIG. 2.

Figure 2:
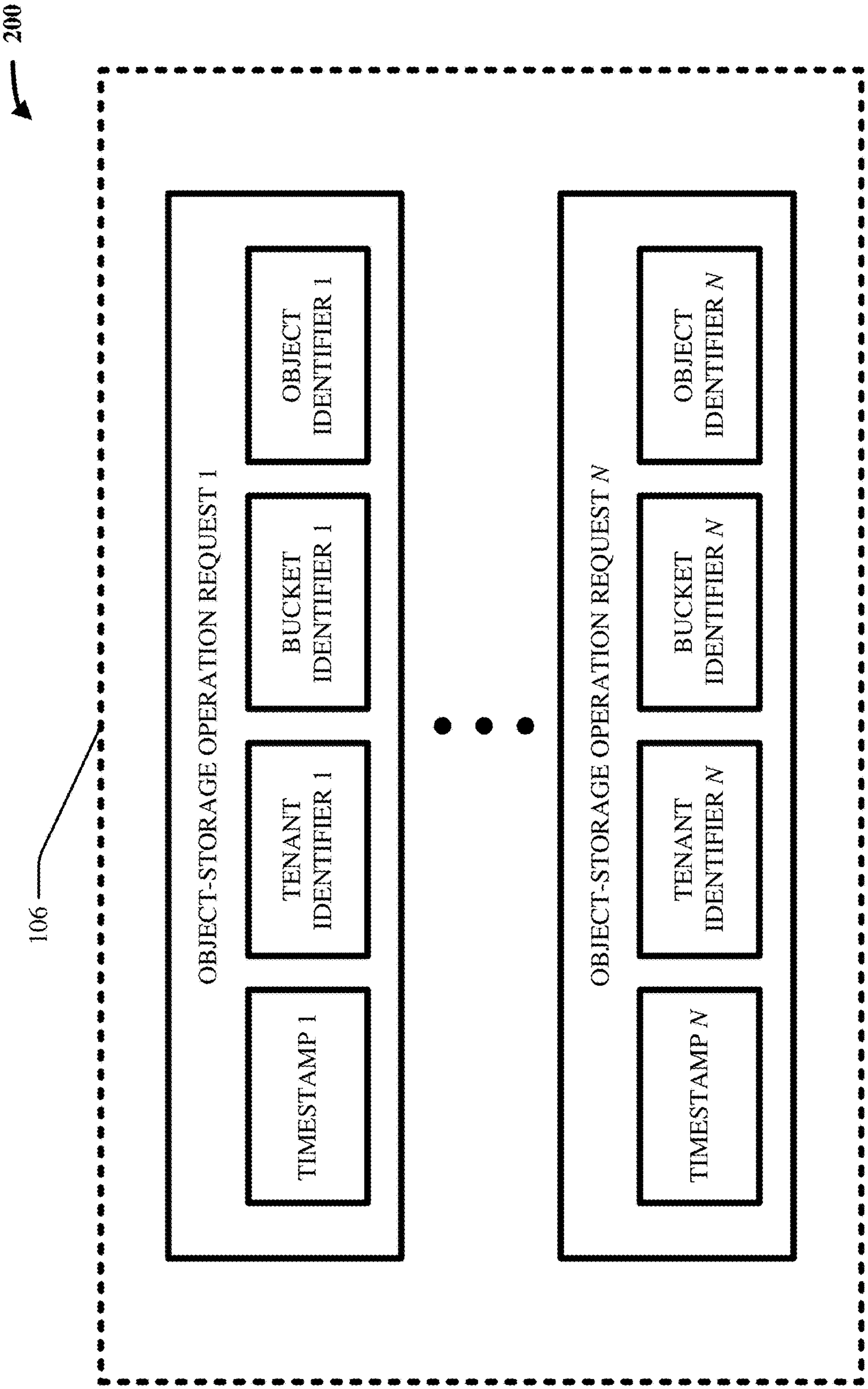
FIG. 2 illustrates an example, non-limiting block diagram of a stream and/or set of object-storage operation requests in accordance with one or more embodiments described herein.

FIG. 2 illustrates an example, non-limiting block diagram 200 of a stream and/or set of object-storage operation requests in accordance with one or more embodiments described herein. That is, FIG. 2 depicts a non-limiting example embodiment of the set of object-storage operation requests 106.

In various embodiments, the set of object-storage operation requests 106 can include n requests, for any suitable positive integer n: an object-storage operation request 1 to an object-storage operation request n. In various aspects, each object-storage operation request can have and/or otherwise be associated with any suitable attributes. Some non-limiting examples of such attributes can include timestamps, tenant identifiers, bucket identifiers, and/or object identifiers. For instance, the object-storage operation request 1 can have: a timestamp 1 indicating the time and/or date on which the object-storage operation request 1 was made and/or received by the object store 104; a tenant identifier 1 indicating which tenant (e.g., which computing client) made, transmitted, and/or otherwise requested the object-storage operation request 1; a bucket identifier 1 indicating to which bucket (e.g., to which partition) of the object store 104 the object-storage operation request 1 pertains; and/or an object identifier 1 indicating on which specific stored object the object-storage operation request 1 is to be performed. As another example, the object-storage operation request n can have: a timestamp n indicating the time and/or date on which the object-storage operation request n was made and/or received by the object store 104; a tenant identifier n indicating which tenant (e.g., which computing client) made, transmitted, and/or otherwise requested the object-storage operation request n; a bucket identifier n indicating to which bucket (e.g., to which partition) of the object store 104 the object-storage operation request n pertains; and/or an object identifier n indicating on which specific stored object the object-storage operation request n is to be performed.

In some aspects, different object-storage operation requests in the set of object-storage operation requests 106 can have the same and/or different tenant identifiers as each other, can have the same and/or different bucket identifiers as each other, and/or can have the same and/or different object identifiers as each other. However, in various instances, different object-storage operation requests in the set of object-storage operation requests can have different timestamps than each other (e.g., each object-storage operation request can have a unique timestamp, such that no two requests are received/made/performed at the same time). Accordingly, in such cases, the set of object-storage operation requests 106 can be considered as a chronological stream of requests.

In various instances, n can be very large and/or can continually increase over time. For example, the object store 104 can, in some cases, receive hundreds and/or thousands of object-storage operation requests per second. Accordingly, the set of object-storage operation requests 106 can be voluminous and/or seemingly chaotic (e.g., can appear to be difficult to interpret/analyze).

Referring back to FIG. 1, in any case, the set of object-storage operation requests 106 can considered as an actual workload experienced and/or encountered by the object store 104, and it can be desired to compactly represent the set of object-storage operation requests 106. As described herein, the object store workload representation system 102 can facilitate such compact representation.

In various embodiments, the object store workload representation system 102 can comprise a processor 108 (e.g., computer processing unit, microprocessor) and a computer-readable memory 110 that is operably connected/coupled to the processor 108. The memory 110 can store computer-executable instructions which, upon execution by the processor 108, can cause the processor 108 and/or other components of the object store workload representation system 102 (e.g., access component 112, bin component 114, sequence component 116, model component 118, and/or execution component 120) to perform one or more acts. In various embodiments, the memory 110 can store computer-executable components (e.g., access component 112, bin component 114, sequence component 116, model component 118, and/or execution component 120), and the processor 108 can execute the computer-executable components.

In various embodiments, the object store workload representation system 102 can comprise an access component 112. In various aspects, the access component 112 can electronically receive, retrieve, obtain, and/or otherwise access the set of object-storage operation requests 106. In some cases, the access component 112 can electronically retrieve the set of object-storage operation requests 106 from any suitable computing device (not shown) as desired. In other cases, the access component 112 can electronically retrieve the set of object-storage operation requests 106 from the object store 104 itself. In still other cases, the access component 112 can electronically intercept the set of object-storage operation requests 106 as they are being transmitted to the object store 104. In any case, the access component 112 can electronically access the set of object-storage operation requests 106, such that other components of the object store workload representation system 102 can electronically interact with the set of object-storage operation requests 106.

In various embodiments, the object store workload representation system 102 can comprise a bin component 114. In various aspect, as described herein, the bin component 114 can electronically segment and/or sort the set of object-storage operation requests 106 into a set of bins. This can be considered as helping to decrease a volume and/or chaos exhibited by the set of object-storage operation requests 106.

In various embodiments, the object store workload representation system 102 can further comprise a sequence component 116. In various instances, as described herein, the sequence component 116 can electronically identify a set of repeating object-storage operation sequences based on the set of bins. This can be considered as further helping to decrease a volume and/or chaos exhibited by the set of object-storage operation requests.

In various embodiments, the object store workload representation system 102 can further comprise a model component 118. In various cases, as described herein, the model component 118 can electronically generate a set of distribution ensembles, based on the set of repeating object-storage operation sequences. This can be considered as even further helping to decrease a volume and/or chaos exhibited by the set of object-storage operation requests 106.

In various embodiments, the object store workload representation system 102 can further comprise an execution component 120. In various aspects, as described herein, the execution component 120 can electronically initiate any suitable actions based on the set of distribution ensembles (e.g., can recommend whether the object store 104 should be reconfigured, and/or can troubleshoot the object store 104).

Figure 3:
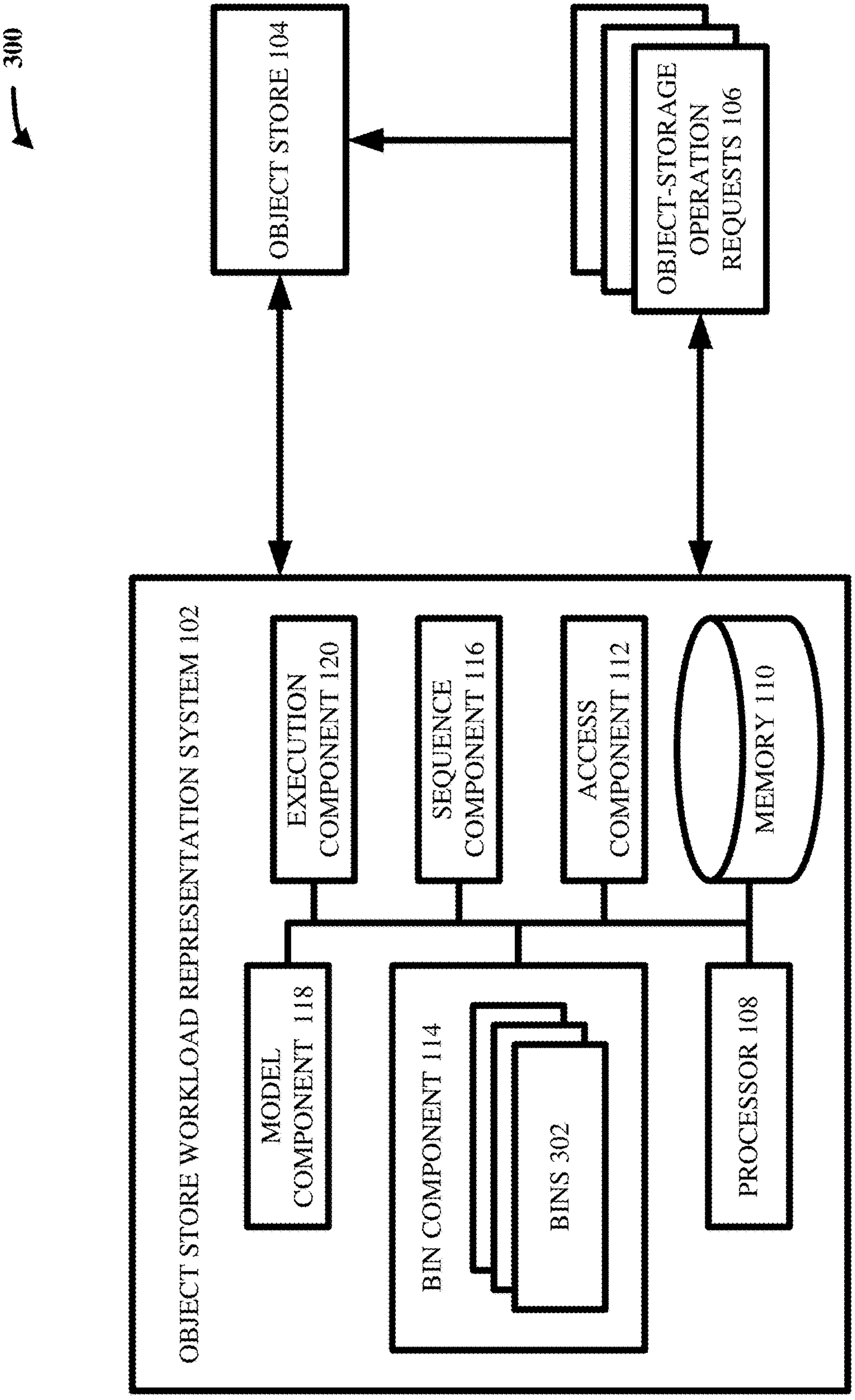
FIG. 3 illustrates a block diagram of an example, non-limiting system including a set of bins that facilitates compact representation of object store workloads in accordance with one or more embodiments described herein.

FIG. 3 illustrates a block diagram of an example, non-limiting system 300 including a set of bins that can facilitate compact representation of object store workloads in accordance with one or more embodiments described herein. As shown, the system 300 can, in some cases, comprise the same components as the system 100, and can further comprise a set of bins 302.

In various embodiments, the bin component 114 can electronically generate the set of bins 302, based on the set of object-storage operation requests 106. More specifically, the bin component 114 can electronically sort, segment, separate, group, and/or otherwise organize the set of object-storage operation requests 106 into subsets of related object-storage operation requests, and each of such subsets can be considered as one of the set of bins 302. This is explained in more detail with respect to FIG. 4.

Figure 4:
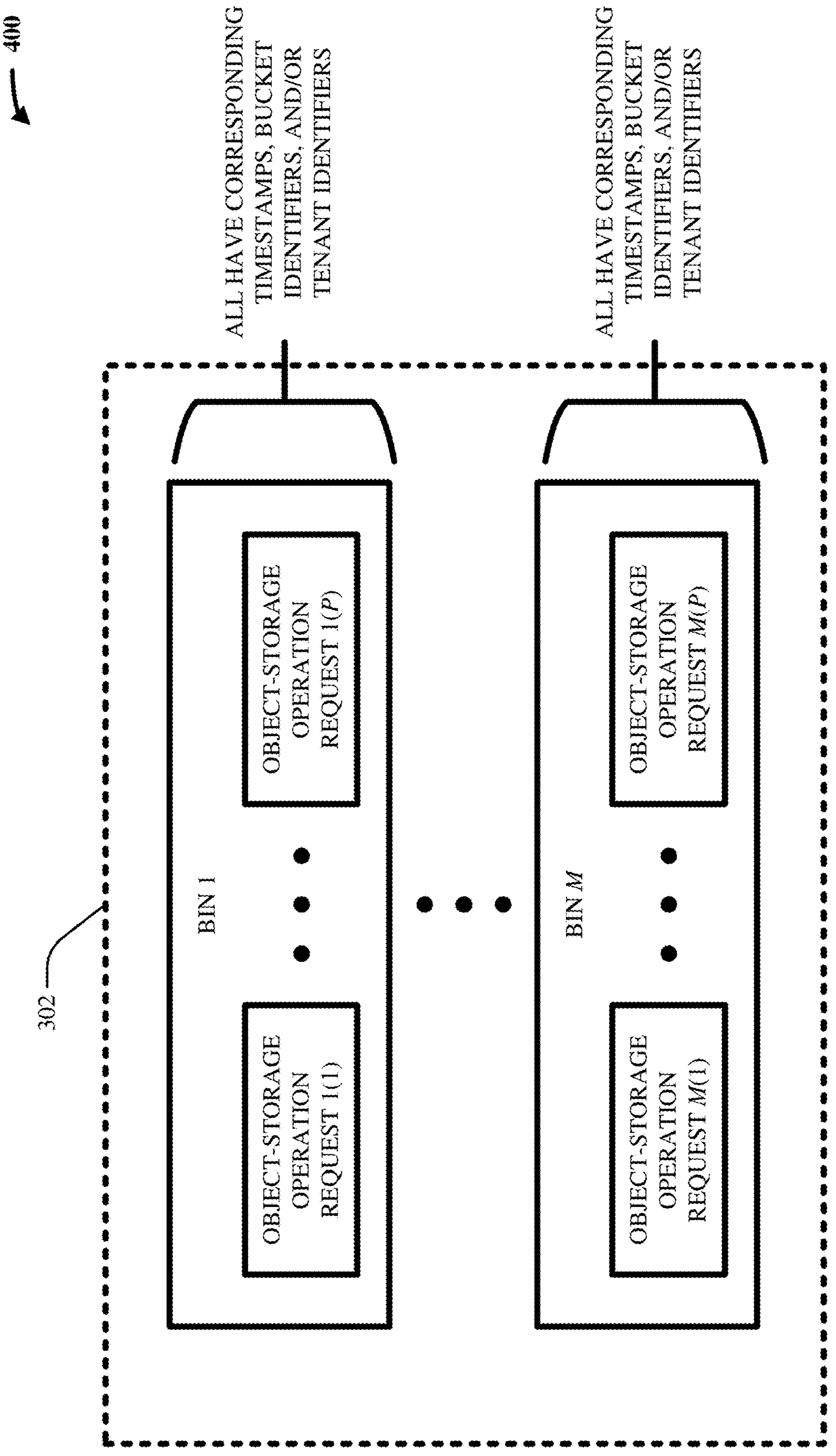
FIG. 4 illustrates an example, non-limiting block diagram of a set of bins in accordance with one or more embodiments described herein.

FIG. 4 illustrates an example, non-limiting block diagram 400 of a set of bins in accordance with one or more embodiments described herein. That is, FIG. 4 depicts an example, non-limiting embodiment of the set of bins 302.

In various embodiments, as shown, the set of bins 302 can include m bins, for any suitable positive integer $m<n$: a bin 1 to a bin m. In various aspects, each bin can include any suitable number of object-storage operation requests that have corresponding attributes as each other. For example, the bin 1 can include p object-storage operation requests for any suitable positive integer $p<n$: an object-storage operation request 1(1) to an object-storage operation request 1(*p*). Moreover, the object-storage operation request 1(1) to the object-storage operation request 1(*p*) can all have corresponding attributes as each other (e.g., can all share the same tenant identifier, can all share the same bucket identifier, and/or can all have timestamps falling within any suitable predetermined time period). As another example, the bin m can include p object-storage operation requests: an object-storage operation request m(1) to an object-storage operation request m(p). Furthermore, the object-storage operation request m(1) to the object-storage operation request m(p) can all have corresponding attributes as each other (e.g., can all share the same tenant identifier, can all share the same bucket identifier, and/or can all have timestamps falling within any suitable predetermined time period).

Accordingly, the bin component 114 can electronically organize the set of object-storage operation requests 106 into the set of bins 302 (e.g., each request belonging to one bin), such that similar object-storage operation requests can be grouped into the same bin as each other (e.g., same tenant identifier, same bucket identifier, similar timestamps), and such that differing object-storage operation requests can be grouped into different bins as each other (e.g., different tenant identifiers, different bucket identifiers, dissimilar timestamps).

Although FIG. 4 illustrates the bin 1 and the bin m as containing the same number of object-storage operation requests as each other (e.g., p), this is a mere non-limiting example for ease of explanation. In various aspects, different bins in the set of bins 302 can contain the same and/or different numbers of object-storage operation requests as each other.

In various aspects, the functionality of the bin component 114 (e.g., the act of binning, segmenting, and/or sorting the set of object-storage operation requests 106 into the set of bins 302) can be considered as helping to reduce variance (and thus volume and/or chaos) exhibited by the set of object-storage operation requests 106.

Figure 5:
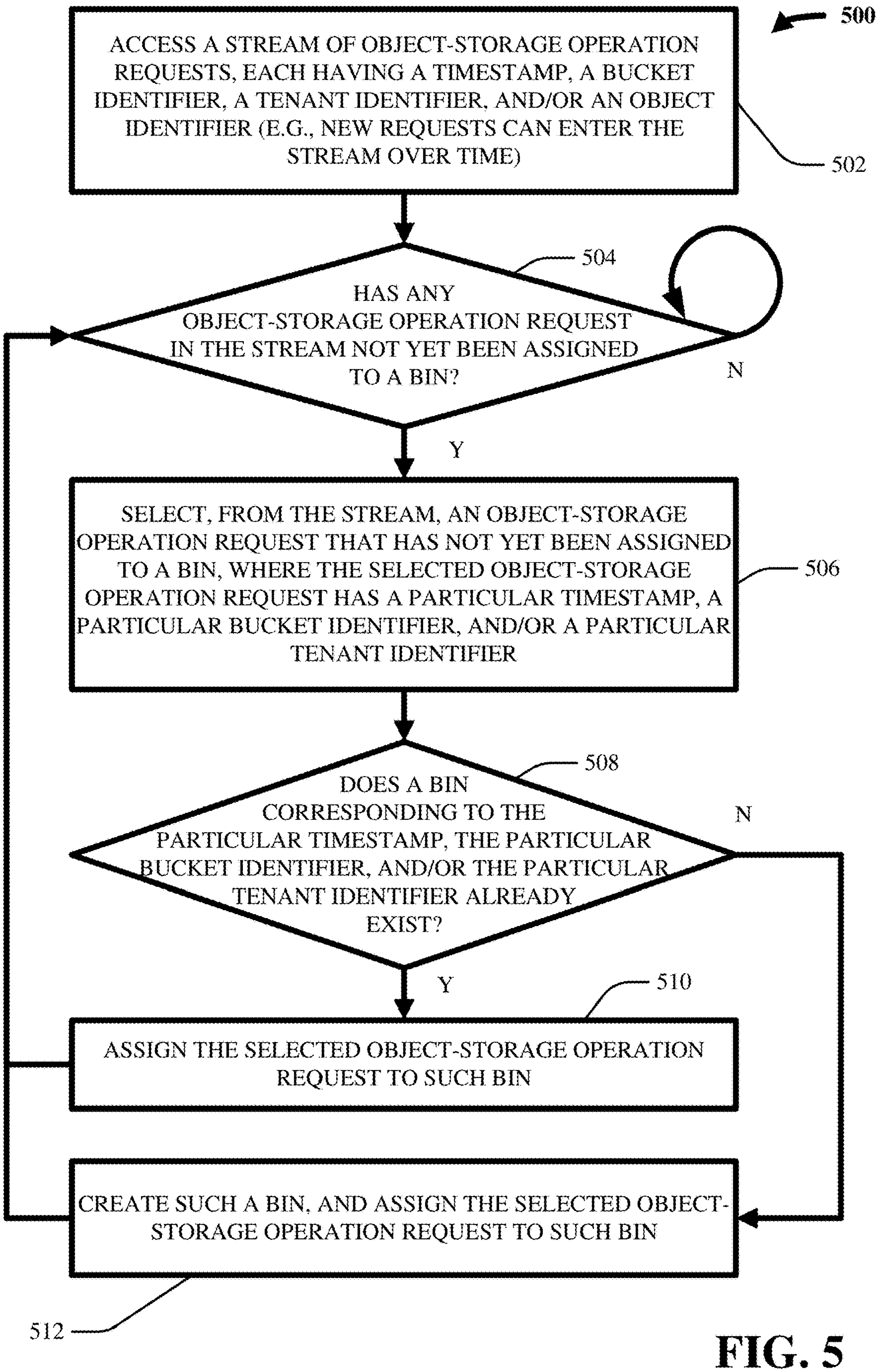
FIG. 5 illustrates a flow diagram of an example, non-limiting computer-implemented method that can create a set of bins in accordance with one or more embodiments described herein.

FIG. 5 illustrates a flow diagram of an example, non-limiting computer-implemented method 500 that can create a set of bins in accordance with one or more embodiments described herein. In other words, FIG. 5 further helps to explain how the bin component 114 can generate the set of bins 302.

In various embodiments, act 502 can include accessing, by a device (e.g., via 112) operatively coupled to a processor, a stream of object-storage operation requests (e.g., 106). In various cases, each object-storage operation request can have a timestamp, a bucket identifier, a tenant identifier, and/or an object identifier. In various instances, the stream of object-storage operation requests can grow over time (e.g., new operation requests can enter the stream as time progresses).

In various aspects, act 504 can include determining, by the device (e.g., via 114), whether any object-storage operation request in the stream has not yet been assigned to a bin. If not (e.g., if all requests in the stream have already been assigned to bins), the computer-implemented method 500 can repeat act 504 (e.g., can wait for new requests to enter the stream). Otherwise (e.g., if at least one request in the stream has not already been assigned to a bin), the computer-implemented method 500 can proceed to act 506.

In various instances, act 506 can include selecting, by the device (e.g., via 114) and from the stream, an object-storage operation request that has not yet been assigned to a bin. In various cases, the selected object-storage operation request can be considered as having a particular timestamp, a particular bucket identifier, and/or a particular tenant identifier.

In various aspects, act 508 can include determining, by the device (e.g., via 114), whether a bin corresponding to the particular timestamp, corresponding to the particular bucket identifier, and/or corresponding to the particular tenant identifier already exists. In other words, this can include determining whether a bin has already been created to contain requests that have the particular timestamp, the particular bucket identifier, and/or the particular tenant identifier. If so (e.g., if such a bin has already been created), the computer-implemented method 500 can proceed to act 510. If not (e.g., if such a bin has not yet been created), the computer-implemented method 500 can proceed to act 512.

In various instances, act 510 can include assigning, by the device (e.g., via 114) the selected object-storage operation request to such already-existing bin. As shown, the computer-implemented method 500 can then proceed back to act 504.

In various aspects, act 512 can include creating, by the device (e.g., via 114), such a bin (e.g., creating a bin to contain all requests that have the particular bucket identifier, the particular tenant identifier, and/or the particular timestamp) and assigning, by the device (e.g., via 114), the selected object-storage operation request to such bin. As shown, the computer-implemented method 500 can then proceed back to act 504.

Thus, the computer-implemented method 500 can be considered as showing how similar object-storage operation requests (e.g., requests having shared and/or corresponding bucket identifiers, tenant identifiers, and/or timestamps) can be grouped/sorted together into bins.

Figure 6:
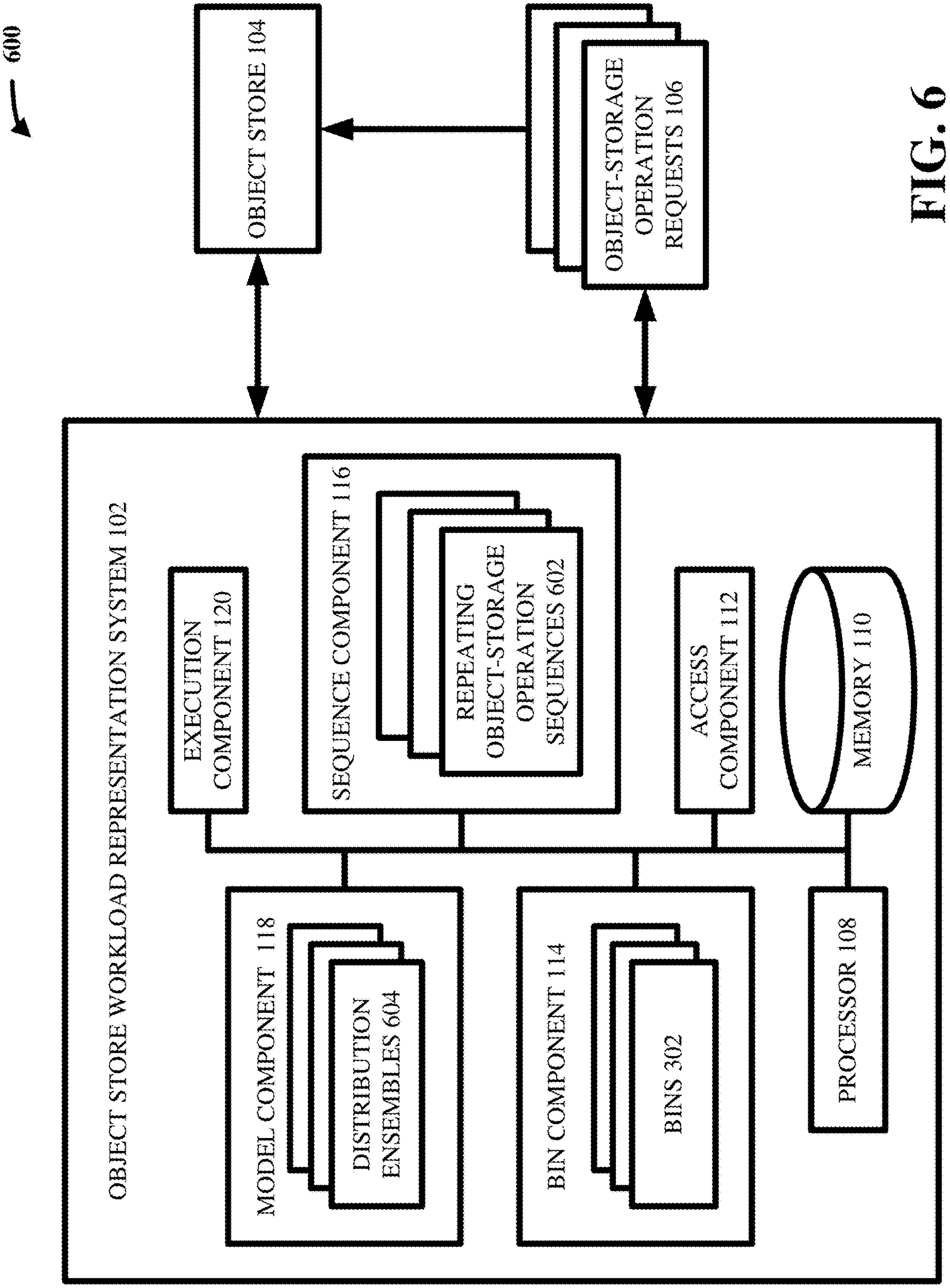
FIG. 6 illustrates a block diagram of an example, non-limiting system including a set of repeating object-storage operation sequences and/or a set of distribution ensembles that facilitates compact representation of object store workloads in accordance with one or more embodiments described herein.

FIG. 6 illustrates a block diagram of an example, non-limiting system 600 including a set of repeating object-storage operation sequences and/or a set of distribution ensembles that can facilitate compact representation of object store workloads in accordance with one or more embodiments described herein. As shown, the system 600 can, in some cases, comprise the same components as the system 300, and can further comprise a set of repeating object-storage operation sequences 602 and/or a set of distribution ensembles 604.

In various embodiments, the sequence component 116 can electronically generate the set of repeating object-storage operation sequences 602, based on the set of bins 302. Moreover, the model component 118 can electronically generate the set of distribution ensembles 604, based on the set of repeating object-storage operation sequences 602. This is explained in more detail with respect to FIGS. 7-12.

Figure 7:
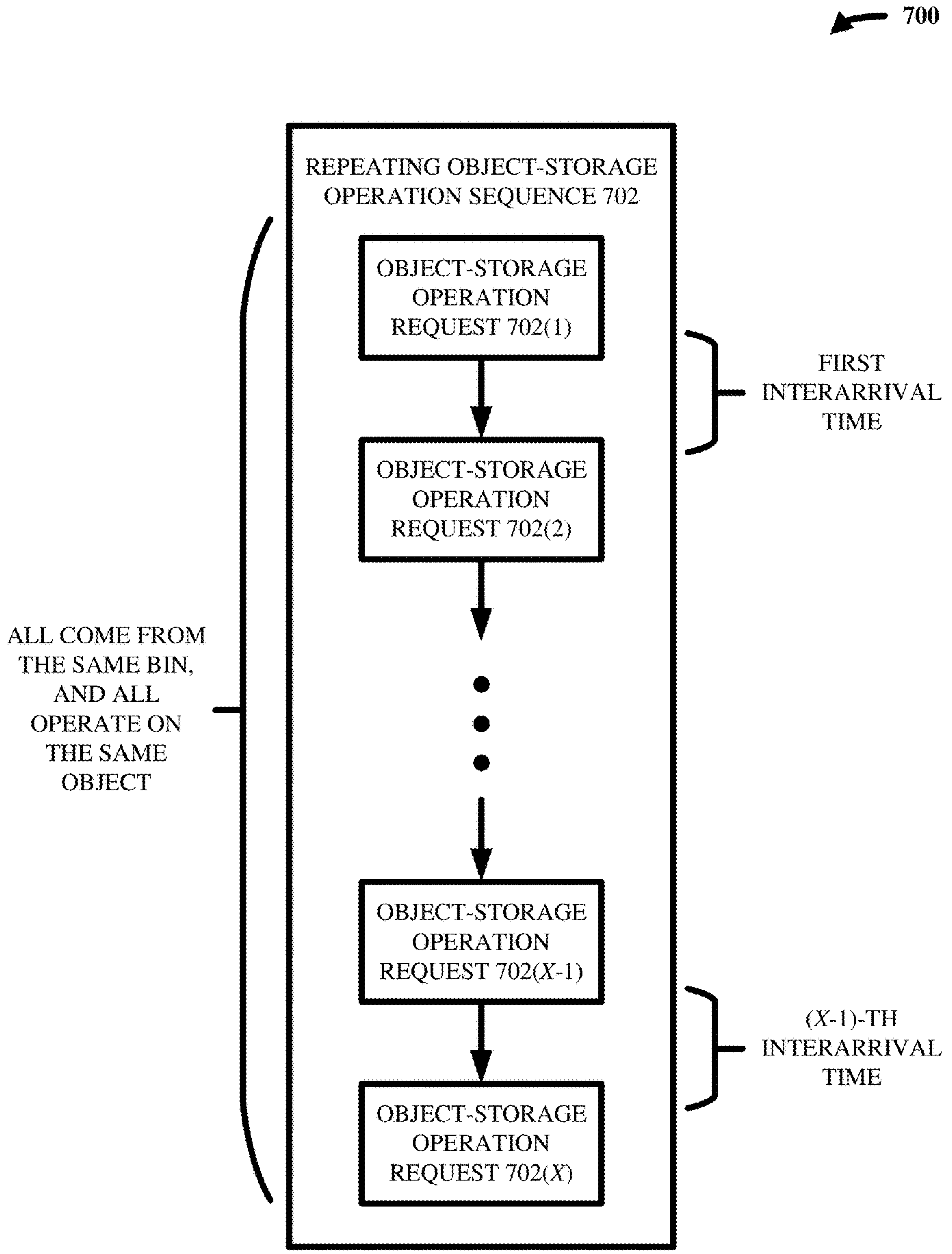
FIG. 7 illustrates an example, non-limiting block diagram of a repeating object-storage operation sequence in accordance with one or more embodiments described herein.

FIG. 7 illustrates an example, non-limiting block diagram 700 of a repeating object-storage operation sequence in accordance with one or more embodiments described herein. That is, FIG. 7 depicts a non-limiting example embodiment of one of the set of repeating object-storage operation sequences 602.

In various embodiments, as shown, there can be a repeating object-storage operation sequence 702. In various aspects, the repeating object-storage operation sequence 702 can be any one of the set of repeating object-storage operation sequences 602. In various instances, as shown, the repeating object-storage operation sequence 702 can include a total of x object-storage operation requests, for any suitable positive integer $x<n$, where such x object-storage operation requests are all from the same bin as each other, are all performed on the same object as each other, and are performed in a given chronological order.

For example, the repeating object-storage operation sequence 702 can include an object-storage operation request 702(1), an object-storage operation request 702(2), and so on, culminating with an object-storage operation request 702($x-1$) and an object-storage operation request 702($x$). In various cases, each of such x total operation requests can come from a same bin in the set of bins 302. Thus, each of such x total operation requests can be considered as having corresponding (e.g., shared) attributes (e.g., can have the same bucket identifier and/or tenant identifier as each other, can have related/corresponding timestamps as each other). Furthermore, each of such x total operation requests can have the same object identifier as each other. That is, each of such x total operation requests can be considered as being performed on and/or otherwise pertaining to the same object as each other. Further still, in various aspects, such x total operation requests can be performed in a given chronological order. For instance, the object-storage operation request 702(1) can have an earliest timestamp of the x total operation requests, meaning that the object-storage operation request 702(1) can be considered as the chronologically first operation request in the repeating object-storage operation sequence 702. Similarly, the object-storage operation request 702(2) can have a second earliest timestamp of the x total operation requests, meaning that the object-storage operation request 702(2) can be considered as the chronologically second operation request in the repeating object-storage operation sequence 702. Likewise, the object-storage operation request 702($x$−1) can have a second most recent timestamp of the x total operation requests, meaning that the object-storage operation request 702($x$−1) can be considered as the chronologically second-to-last operation request in the repeating object-storage operation sequence 702. Additionally, the object-storage operation request 702($x$) can have a most recent timestamp of the x total operation requests, meaning that the object-storage operation request 702($x$) can be considered as the chronologically last operation request in the repeating object-storage operation sequence 702.

In various embodiments, the repeating object-storage operation sequence 702 can be considered as having and/or otherwise being associated with various attributes. As some non-limiting examples, such attributes can include an object size and/or one or more interarrival times, as described herein.

For instance, because the x total object-storage operation requests can all operate on the same particular object as each other (e.g., all have the same object identifier), the repeating object-storage operation sequence 702 can be considered as corresponding to that particular object. Moreover, because that particular object can have a particular object size (e.g., as measured in bytes), the repeating object-storage operation sequence 702 can be considered as corresponding to that particular object size. In other words, that particular object size can be considered as an attribute and/or characteristic of the repeating object-storage operation sequence 702.

As another example, an interarrival time can be considered as an amount of time that elapses between any two consecutive operation requests of a repeating object-storage operation sequence. Accordingly, because the repeating object-storage operation sequence 702 can have a length of x (e.g., can have a total of x operation requests), the repeating object-storage operation sequence 702 can be considered as having x−1 interarrival times: a first interarrival time between the object-storage operation request 702(1) and the object-storage operation request 702(2), to an (x−1)-th interarrival time between the object-storage operation request 702($x$−1) and the object-storage operation request 702($x$). In various instances, the first interarrival time can be computed as the difference (e.g., elapsed time) between the timestamp of the object-storage operation request 702(1) and the timestamp of the object-storage operation request 702(2). Similarly, the (x−1)-th interarrival time can be computed as the difference (e.g., elapsed time) between the timestamp of the object-storage operation request 702($x$−1) and the timestamp of the object-storage operation request 702($x$). Although not explicitly shown in FIG. 7, an additional interarrival time can be included in various embodiments (e.g., an interarrival time indicating how much time elapses between the object-storage operation request 702($x$) and the first object-storage operation request of the next iteration/copy of the repeating object-storage operation sequence 702). In any case, the x−1 interarrival times can be considered as attributes and/or characteristics of the repeating object-storage operation sequence 702.

Although FIG. 7 illustrates the repeating object-storage operation sequence 702 as having a length of x (e.g., as having a total of x operation requests), this is a mere non-limiting example for ease of illustration. In various cases, different repeating object-storage operation sequences (e.g., different ones of the set of repeating object-storage operation sequences 602) can have the same and/or different lengths as each other.

So, as explained, FIG. 7 illustrates an example non-limiting embodiment of one of the set of repeating object-storage operation sequences 602. In various aspects, the sequence component 116 can electronically generate the set of repeating object-storage operation sequences 602 in bin-wise fashion based on the set of bins 302. More specifically, for each given bin in the set of bins 302, the sequence component 116 can electronically generate and/or identify one or more repeating object-storage operation sequences by grouping together operation requests belonging to that given bin according to object identifier and by ordering, for each of those groups, the operation requests chronologically according to timestamp. By performing this for each bin in the set of bins 302, the ultimate result can be the set of repeating object-storage operation sequences 602. In various aspects, the functionality of the sequence component 116 (e.g., the act of identifying the set of repeating object-storage operation sequences 602 based on the set of bins 302) can be considered as further helping to reduce variance (and thus volume and/or chaos) exhibited by the set of object-storage operation requests 106.

As described above, each of the set of repeating object-storage operation sequences 602 can have various attributes (e.g., object size, interarrival times). Accordingly, in various cases, the model component 118 can electronically compute frequency distributions and/or probability density distributions of such attributes. In various instances, such frequency distributions and/or probability density distributions can collectively be considered as the set of distribution ensembles 604.

Figure 8:
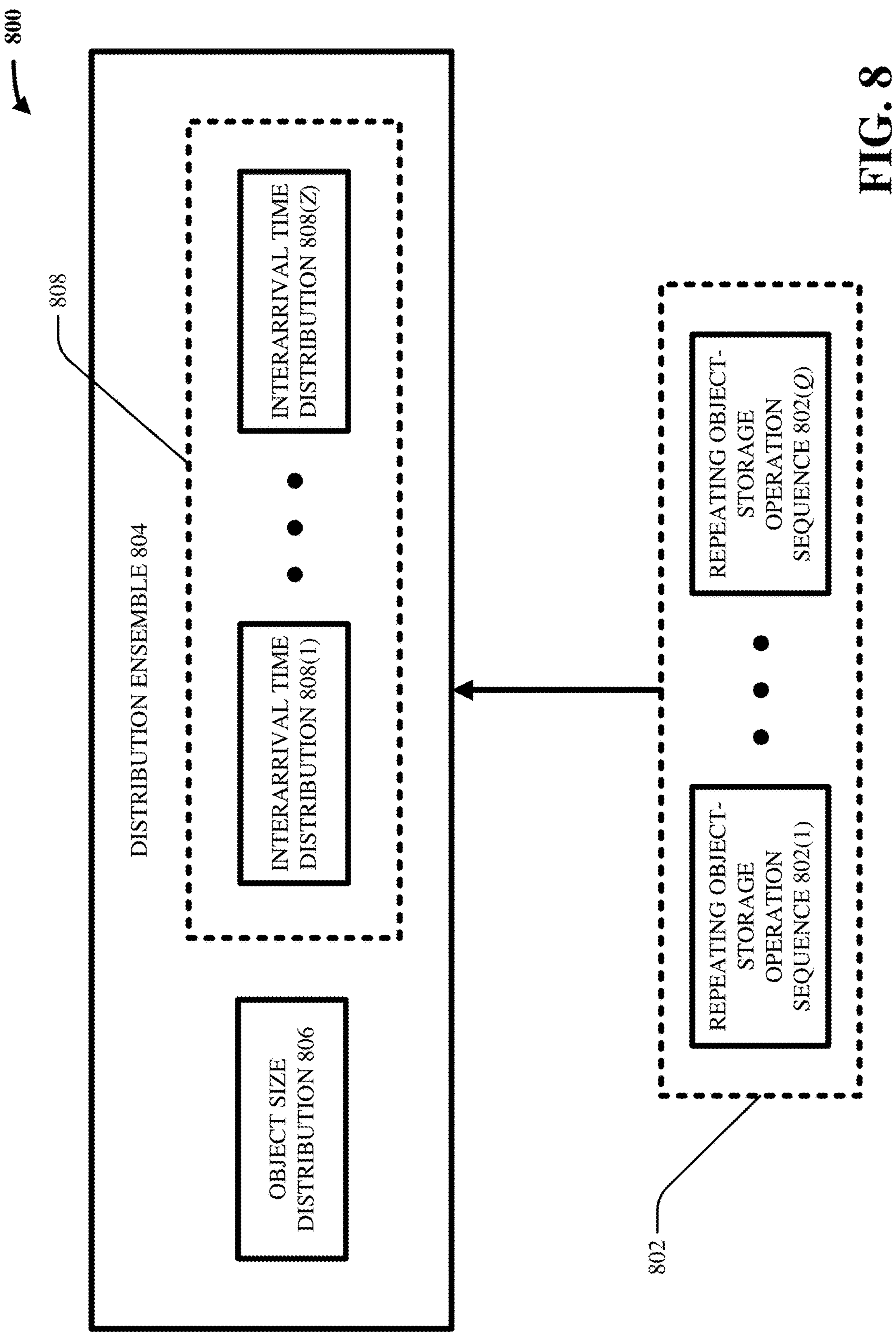
FIG. 8 illustrates an example, non-limiting block diagram of a distribution ensemble in accordance with one or more embodiments described herein.

FIG. 8 illustrates an example, non-limiting block diagram 800 of a distribution ensemble in accordance with one or more embodiments described herein. That is, FIG. 8 depicts a non-limiting example embodiment of one of the set of distribution ensembles 604.

In various embodiments, as shown, there can be a collection of repeating object-storage operation sequences 802, and there can be a distribution ensemble 804 that is based on and/or otherwise associated with the collection of repeating object-storage operation sequences 802.

In various aspects, the collection of repeating object-storage operation sequences 802 can be any suitable subset of the set of repeating object-storage operation sequences 602. As a non-limiting example, the collection of repeating object-storage operation sequences 802 can include q sequences for any suitable positive integer $q<n$: a repeating object-storage operation sequence 802(1) to a repeating object-storage operation sequence 802($q$). In various instances, each of the collection of repeating object-storage operation sequences 802 can be of length z+1, for any suitable positive integer $z<n$.

As mentioned above, each repeating object-storage operation sequence can have and/or otherwise be associated with various attributes, such as object size and/or interarrival times. For example, in various aspects, each of the collection of repeating object-storage operation sequences 802 can have a corresponding object size. As another example, since each of the collection of repeating object-storage operation sequences 802 can be of length z+1, each of the collection of repeating object-storage operation sequences 802 can also have z corresponding interarrival times. That is, in various cases, the repeating object-storage operation sequence 802(1) can have a first object size and a total of z first interarrival times, and the repeating object-storage operation sequence **802(*q*)** can have a q-th object size and a total of z q-th interarrival times.

In any case, the collection of repeating object-storage operation sequences 802 can have various attributes (e.g., object size, interarrival times), and the distribution ensemble 804 can include frequency distributions and/or probability density distributions that quantify, convey, and/or describe how those attributes vary across the collection of repeating object-storage operation sequences 802.

For instance, because each of the collection of repeating object-storage operation sequences 802 can have an object size attribute, the distribution ensemble 804 can include an object size distribution 806 that represents variation in object size across the collection of repeating object-storage operation sequences 802. As some non-limiting examples, the object size distribution 806 can be a rectangular distribution, a normal (e.g., Gaussian) distribution, and/or a gamma (e.g., exponential) distribution. No matter its shape and/or type, the object size distribution 806 can be designated by any suitable statistical metrics as desired. For example, the object size distribution 806 can be designated by an average and/or mean object size value, a median object size value, and/or a standard deviation object size value.

As another example, because each of the collection of repeating object-storage operation sequences 802 can have various interarrival time attributes, the distribution ensemble 804 can include a set of interarrival time distributions 808, each of which can represent variation in a particular interarrival time across the collection of repeating object-storage operation sequences 802. In particular, since each of the collection of repeating object-storage operation sequences 802 can have z interarrival time attributes, the set of interarrival time distributions 808 can have z interarrival time distributions: an interarrival time distribution 808(1) to an interarrival time distribution **808(*z*). In various cases, the interarrival time distribution 808(1) can have any suitable shape (e.g., rectangular, normal, gamma) and can describe how the first interarrival time varies across the collection of repeating object-storage operation sequences 802. Thus, the interarrival time distribution 808(1) can be designated by an average and/or mean first interarrival time value, a median first interarrival time value, and/or a standard deviation first interarrival time value. Likewise, the interarrival time distribution 808(*z*) can have any suitable shape (e.g., rectangular, normal, gamma) and can describe how the z-th interarrival time varies across the collection of repeating object-storage operation sequences 802. Thus, the interarrival time distribution 808(*z*)** can be designated by an average and/or mean z-th interarrival time value, a median z-th interarrival time value, and/or a standard deviation z-th interarrival time value.

In various aspects, because the collection of repeating object-storage operation sequences 802 can include a total of q sequences, the distribution ensemble 804 (e.g., the object size distribution 806 and each of the set of interarrival time distributions 808) can be considered as having a cardinality (e.g., a count) of q.

Although FIG. 8 depicts the distribution ensemble 804 as having a cardinality of q and as having z interarrival time distributions, this is a mere non-limiting example for ease of explanation. Those having ordinary skill in the art will appreciate that different distribution ensembles (e.g., different ones of 604) can have the same and/or different cardinalities as each other. Moreover, those having ordinary skill in the art will appreciate that the number of interarrival time distributions in a given distribution ensemble can depend upon the length of the sequences on which the distribution ensemble is based. Thus, different distribution ensembles can have the same and/or different number of interarrival time distributions as each other.

In some cases, additional memory space can be saved and/or safeguarded by eliminating the underlying sequences for a distribution ensemble and by instead just representing the distribution ensemble via its statistical metrics (e.g., means, medians, modes, standard deviations, cardinality). For instance, once the distribution ensemble 804 is computed based on the collection of repeating object-storage operation sequences 802, the collection of repeating object-storage operation sequences 802 can be deleted, thereby freeing up some additional computer memory space.

So, as explained, FIG. 8 illustrates an example non-limiting embodiment of one of the set of distribution ensembles 604. In various aspects, the model component 118 can electronically generate the set of distribution ensembles 604 in bin-wise fashion based on the set of repeating object-storage operation sequences 602. More specifically, for each given bin in the set of bins 302, the sequence component 116 can electronically generate and/or identify one or more repeating object-storage operation sequences as described above. For that given bin, the model component 118 can then electronically group similar ones of those generated/identified sequences together and can compute, for each of those groups, a distribution ensemble. By performing this for each bin in the set of bins 302, the ultimate result can be the set of distribution ensembles 604. In various aspects, the functionality of the model component 118 (e.g., the act of generating the set of distribution ensembles 604 based on the set of repeating object-storage operation sequences 602) can be considered as further helping to reduce variance (and thus volume and/or chaos) exhibited by the set of object-storage operation requests 106.

The functionalities of the sequence component 116 and the model component 118 are clarified with respect to FIGS. 9-12.

FIGS. 9-12 illustrate flow diagrams of example, non-limiting computer-implemented methods 900, 1000, 1100, and 1200 for identifying repeating object-storage operation sequences and/or for generating distribution ensembles in accordance with one or more embodiments described herein. In other words, FIGS. 9-12 clearly set out an algorithm that can be implemented to generate the set of repeating object-storage operation sequences 602 and/or the set of distribution ensembles 604, based on the set of bins 302.

Figure 9:
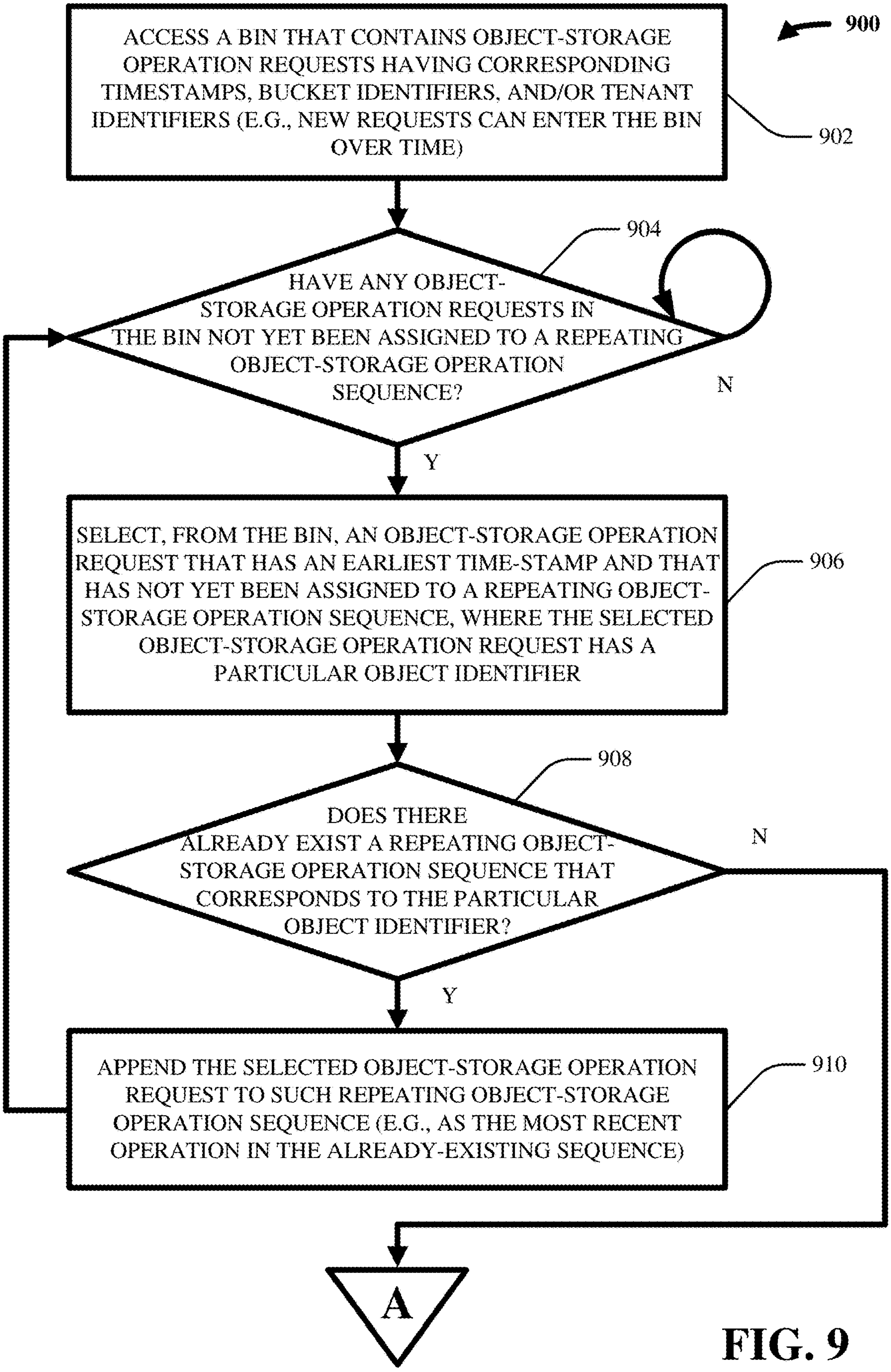
FIGS. 9-12 illustrate flow diagrams of example, non-limiting computer-implemented methods for identifying repeating object-storage operation sequences and/or for generating distribution ensembles in accordance with one or more embodiments described herein.

First, consider the computer-implemented method 900 as shown in FIG. 9. In various embodiments, act 902 can include accessing, by a device (e.g., via 114 and/or via 116) operatively coupled to a processor, a bin (e.g., one of 302) that contains object-storage operation requests having corresponding timestamps, bucket identifiers, and/or tenant identifiers. In various cases, the bin can increase in size over time (e.g., new requests can enter and/or be assigned to the bin as time progresses).

In various aspects, act 904 can include determining, by the device (e.g., via 116), whether any object-storage operation requests in the bin have not yet been assigned to a repeating object-storage operation sequence (e.g., one of 602). Initially, it can be the case that none of the requests in the bin have yet been assigned to a corresponding sequence. If all requests in the bin have already been assigned to a corresponding sequence, then the computer-implemented method 900 can repeat act 904 (e.g., can wait for new requests to enter and/or be assigned to the bin). Otherwise (e.g., if at least one request in the bin has not already been assigned to a sequence), the computer-implemented method 900 can proceed to act 906.

In various instances, act 906 can include selecting, by the device (e.g., via 116) and from the bin, an object-storage operation request that has an earliest time-stamp and that has not yet been assigned to a repeating object-storage operation sequence. In various cases, the selected object-storage operation request can have a particular object identifier (e.g., can operate on a particular object).

In various aspects, act 908 can include determining, by the device (e.g., via 116), whether there already exists a repeating object-storage operation sequence (e.g., one of 602) that corresponds to the particular object identifier. Initially, it can be the case that no repeating object-storage operation sequences are yet being identified/tracked. If a repeating object-storage operation sequence that corresponds to the particular object identifier already exists (e.g., is already being identified/tracked), the computer-implemented method 900 can proceed to act 910. If not (e.g., if no repeating object-storage operation sequence that corresponds to the particular object identifier is already being identified/tracked), then the computer-implemented method 900 can proceed to act 1002 of the computer-implemented method 1000.

In various instances, act 910 can include appending, by the device (e.g., via 116), the selected object-storage operation request to the already-existing repeating object-storage operation sequence that corresponds to the particular object identifier. In various cases, the selected object-storage operation request can be added and/or inserted as the most chronologically recent operation in the already-existing sequence. The computer-implemented method 900 can then proceed back to act 904.

Figure 10:
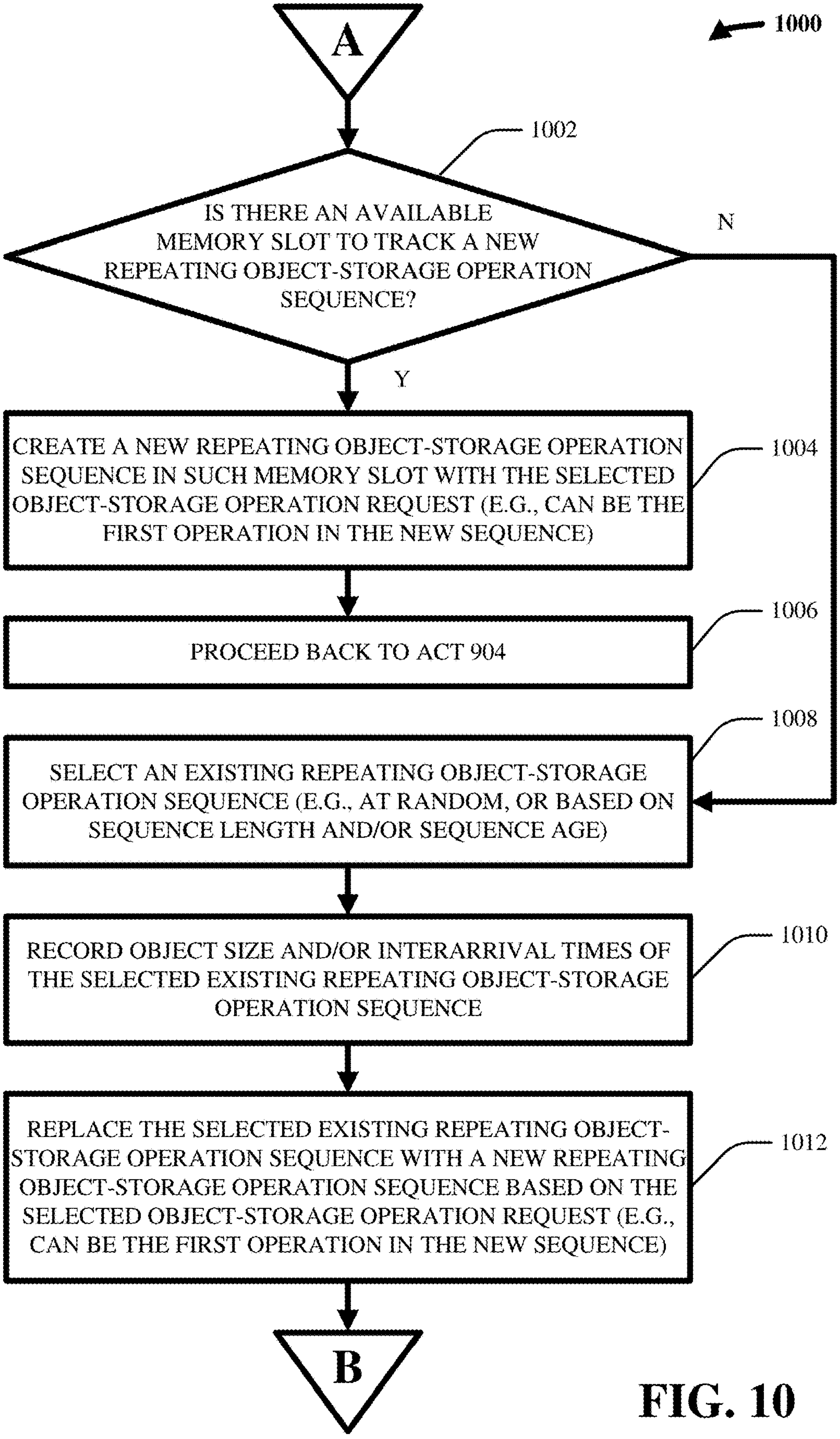

Now, consider the computer-implemented method 1000 as shown in FIG. 10. In various embodiments, act 1002 can include determining, by the device (e.g., via 116), whether there is an available memory slot (e.g., available computer memory space) to track a new repeating object-storage operation sequence. If so (e.g., if there is an available memory slot), the computer-implemented method 1000 can proceed to act 1004. If not (e.g., if there is no available memory slot), the computer-implemented method 1000 can instead proceed to act 1008.

In various aspects, act 1004 can include creating, by the device (e.g., via 116), a new repeating object-storage operation sequence in an available memory slot with and/or based on the selected object-storage operation request (e.g., this can increase the size and/or count of 602). For example, the selected object-storage operation request can be the chronologically first operation in such new sequence. In various cases, the computer-implemented method 1000 can then proceed back to act 904, as shown via numeral 1006.

In various instances, act 1008 can include selecting, by the device (e.g., via 116), an existing repeating object-storage operation sequence. In some cases, such selection can be made at random. In other cases, such selection can be made based on sequence length (e.g., a longest existing sequence can be selected). In still other cases, such selection can be made based on sequence age (e.g., an oldest existing sequence and/or an existing sequence that has been being identified/tracked for a longest amount of time can be selected). In yet other cases, such selection can be made based on elapsed time since last lengthening (e.g., an existing sequence that has not been lengthened and/or added-to in a longest amount of time can be selected).

In various aspects, act 1010 can include recording, by the device (e.g., via 116 and/or via 118), an object size and/or interarrival times associated with the selected existing repeating object-storage operation sequence.

In various instances, act 1012 can include replacing, by the device (e.g., via 116) the selected existing repeating object-storage operation sequence with a new repeating object-storage operation sequence that is based on the selected object-storage operation request (e.g., this can change 602 without increasing its size and/or count). In other words, memory space can be freed up by removing the selected existing repeating object-storage operation sequence, thereby allowing the new sequence to start being identified/tracked. In various cases, the selected object-storage operation request can be the chronologically first operation in the new sequence. In various instances, the computer-implemented method 1000 can then proceed to act 1102 of the computer-implemented method 1100.

Figure 11:
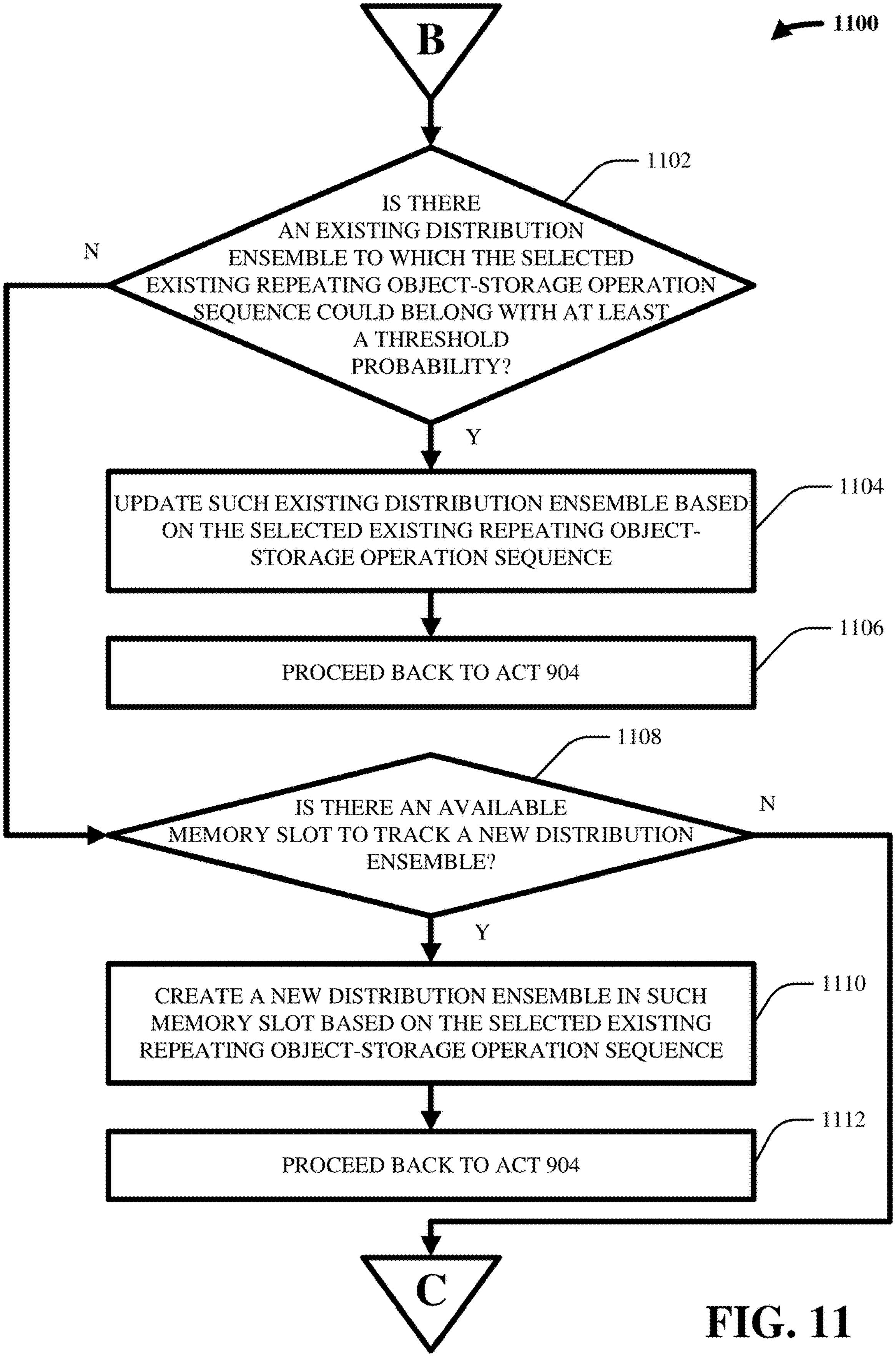

Now, consider the computer-implemented method 1100 as shown in FIG. 11. In various embodiments, act 1102 can include determining, by the device (e.g., via 118), whether there is an existing distribution ensemble (e.g., one of 604) to which the selected existing repeating object-storage operation sequence could belong with at least a threshold probability (e.g., any suitable threshold level of probability can be implemented). Those having ordinary skill in the art will appreciate how to compute and/or estimate a probability associated with a data candidate when given a frequency distribution and/or a probability density distribution (e.g., by computing and/or estimating a definite integral of the frequency distribution and/or probability density distribution over a bounded domain interval that contains the data candidate). Therefore, those having ordinary skill in the art will appreciate, in light of this disclosure, how to compute a probability that the selected existing repeating object-storage operation sequence could have come from (e.g., could have been derived from) a given distribution ensemble.

For example, suppose that the selected existing repeating object-storage operation sequence has an object size and has z interarrival times, and suppose that the given distribution ensemble has an object size distribution and has z interarrival time distributions (e.g., such as is shown in FIG. 8). In such case, a first probability value can be computed/estimated that conveys how likely it is that the object size of the selected existing repeating object-storage operation sequence came from the object size distribution of the given distribution ensemble (e.g., by estimating a definite integral of the object size distribution over a bounded domain interval that contains the object size). Moreover, z second probability values can be computed/estimated that convey how likely it is that the z interarrival times of the selected existing repeating object-storage operation sequence respectively came from the z interarrival time distributions of the given distribution ensemble (e.g., by estimating z definite integrals of the z interarrival time distributions over z bounded domain intervals that respectively contain the z interarrival times).

Although FIG. 11 illustrates act 1102 as being based on probability values, this is a mere non-limiting example. In various other embodiments, act 1102 can be based on computed distances rather than probabilities (e.g., by computing the distance between the object size of the selected existing repeating object-storage operation sequence and the mean and/or median of the object size distribution of the given distribution ensemble; by computing the z distances between the z interarrival times of the selected existing repeating object-storage operation sequence and the z means and/or medians of the z interarrival time distributions of the given distribution ensemble).

If there is an existing distribution ensemble to which the selected existing repeating object-storage operation sequence could belong with at least a threshold probability, then the computer-implemented method 1100 can proceed to act 1104. If not, then the computer-implemented method 1100 can instead proceed to act 1108.

In various aspects, act 1104 can include updating, by the device (e.g., via 118), such existing distribution ensemble based on the selected existing repeating object-storage operation sequence. That is, the cardinality and/or count of the existing distribution ensemble can be incremented by one, and the means, medians, and/or standard deviations of the existing distribution ensemble can change due to the object size and/or due to the interarrival times of the selected existing repeating object-storage operation sequence. In embodiments where the underlying sequences of the existing distribution ensemble have been deleted to save memory space, the cardinality and/or count of the existing distribution ensemble can be incremented by one, but the means, medians, and/or standard deviations of the existing distribution ensemble can remain unchanged. As shown by the numeral 1106, the computer-implemented method 1100 can then proceed back to act 904.

In various instances, act 1108 can include determining, by the device (e.g., via 118), whether there is an available memory slot (e.g., available computer memory space) to track a new distribution ensemble. If so, the computer-implemented method 1100 can proceed to act 1110. If not, the computer-implemented method 1100 can instead proceed to act 1202 of the computer-implemented method 1200.

In various aspects, act 1110 can include creating, by the device (e.g., via 118), a new distribution ensemble in an available memory slot based on the selected existing repeating object-storage operation sequence (e.g., this can increase the size and/or count of 604). As shown by the numeral 1112, the computer-implemented method 1100 can then proceed back to act 904.

Figure 12:
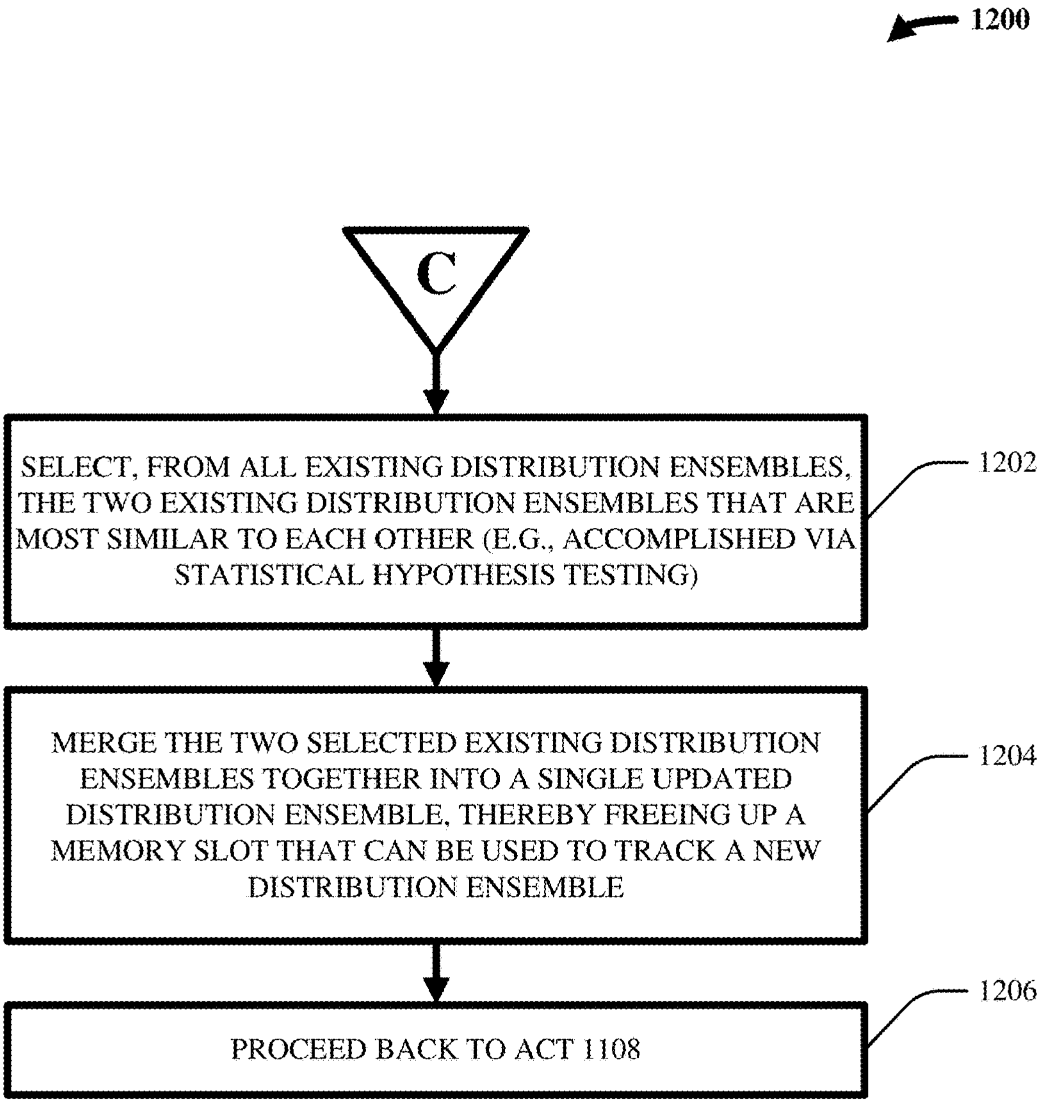

Now, consider the computer-implemented method 1200 as shown in FIG. 12. In various embodiments, act 1202 can include selecting, by the device (e.g., via 118) and from all existing distribution ensembles that correspond to the bin that is accessed in act 802, the two existing distribution ensembles that are most similar to each other. In various cases, this determination can be accomplished via statistical hypothesis testing.

For example, consider a pair of existing distribution ensembles that each have z interarrival time distributions. In various cases, a first statistical hypothesis test (e.g., z-test, t-test) can be performed between the object size distributions of such pair of existing distribution ensembles, thereby yielding a first p-value indicating whether or not the object size distributions of such pair of existing distribution ensembles are statistically significantly different. Moreover, z second statistical hypothesis tests can be performed between the respective interarrival time distributions of such pair of existing distribution ensembles, thereby yielding z second p-values indicating whether or not the interarrival time distributions of such pair of existing distribution ensembles are statistically significantly different. In this way, statistical hypothesis tests can be implemented to compare distribution ensembles, where higher p-values can indicate more similarity between distribution ensembles and/or where lower p-values can indicate less similarity between distribution ensembles. Thus, the two existing distribution ensembles that are most similar to each other can be that pair of existing distribution ensembles for which statistical hypothesis testing yields the highest computed p-values.

In various aspects, act 1204 can include merging, by the device (e.g., via 118), the two selected existing distribution ensembles together, thereby yielding a single updated distribution ensemble. This can be considered as freeing up memory space (e.g., a memory slot) in which a new distribution ensemble can be created and/or tracked. In various cases, merging of two existing distribution ensembles can be facilitated by combining the underlying collections of repeating object-storage operation sequences on which such two existing distribution ensembles are based and by recomputing an object size distribution and/or interarrival time distributions based on such combined collection. As shown in the numeral 1206, the computer-implemented method 1200 can then proceed back to act 1108.

Note that FIGS. 9-12 can be considered as algorithmically describing the actions performed by the sequence component 116 and by the model component 118, so as to generate the set of repeating object-storage operation sequences 602 and the set of distribution ensembles 604. More specifically, FIGS. 9-10 can be considered as showing the algorithmic actions taken by the sequence component 116 to identify and/or generate the set of repeating object-storage operation sequences 602 (e.g., the set of repeating object-storage operation sequences 602 can be changed and/or increased by act 910, act 1004, and/or act 1012). Similarly, FIGS. 11-12 can be considered as showing the algorithmic actions taken by the model component 118 to compute and/or generate the set of distribution ensembles 604 (e.g., the set of distribution ensembles 604 can be changed and/or increased by act 1104, 1110, and/or 1204).

In various aspects, FIGS. 9-12 can be considered as showing the algorithmic actions taken by the sequence component 116 and the model component 118 with respect to a single bin of the set of bins 302. Accordingly, in various cases, the sequence component 116 and the model component 118 can repeat the algorithmic steps shown in FIGS. 9-12 for each of the set of bins 302.

In any case, the sequence component 116 can electronically generate the set of repeating object-storage operation sequences 602 based on the set of bins 302, and the model component 118 can electronically generate the set of distribution ensembles 604 based on the set of repeating object-storage operation sequences 602. In various aspects, the set of distribution ensembles 604 can take up significantly less memory space (e.g., as measured in bytes, kilobytes, megabytes, gigabytes) as compared to the set of object-storage operation requests 106. However, the set of distribution ensembles 604 can be considered as conveying important information (e.g., object size distributions and/or interarrival time distributions) characterizing and/or relating to the set of object-storage operation requests 106. Thus, the set of distribution ensembles 604 can be considered as a compact representation (e.g., a lossy compression) of the set of object-storage operation requests 106.

Figure 13:
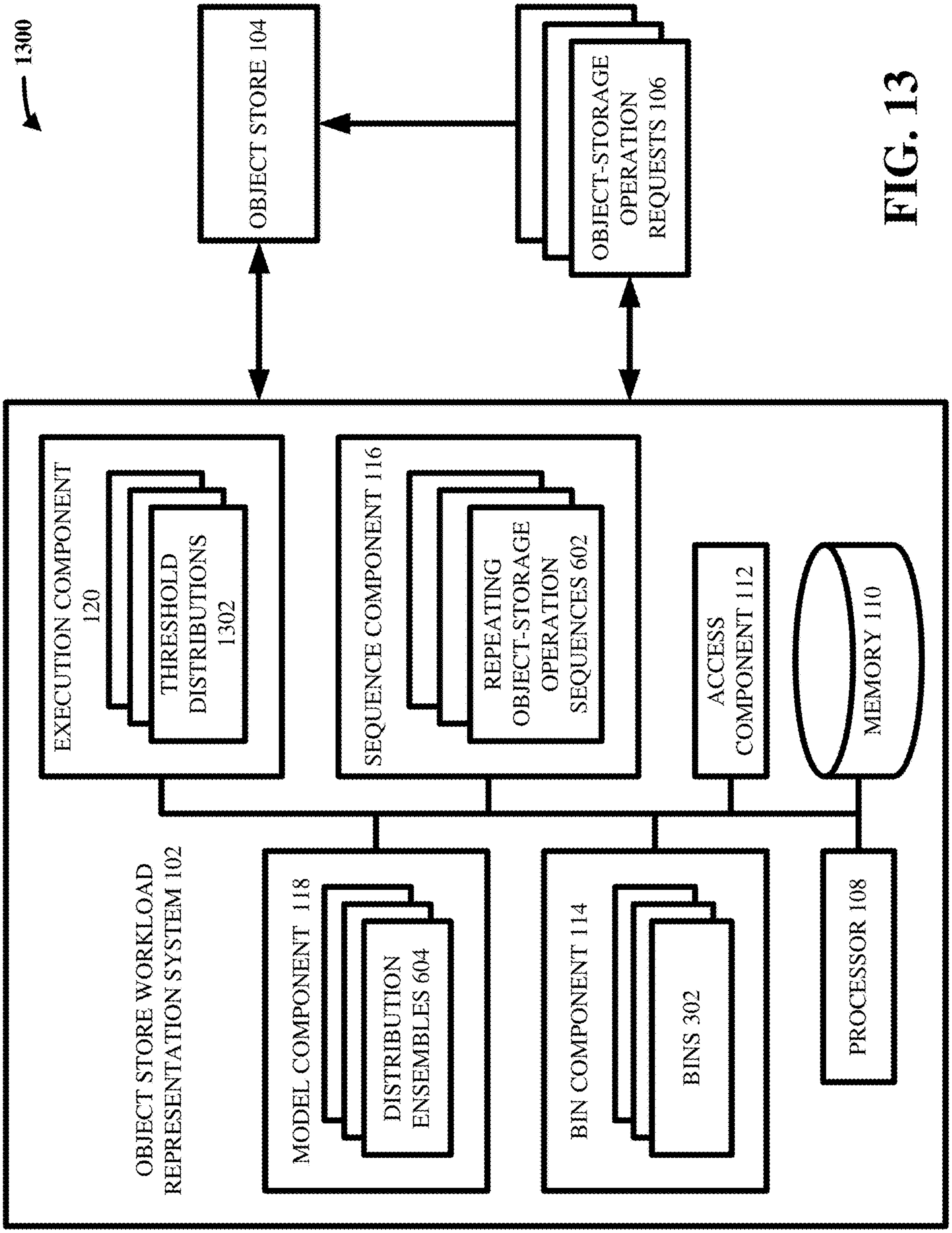
FIG. 13 illustrates a block diagram of an example, non-limiting system including a set of threshold distributions that facilitates compact representation of object store workloads in accordance with one or more embodiments described herein.

FIG. 13 illustrates a block diagram of an example, non-limiting system 1300 including a set of threshold distributions that can facilitate compact representation of object store workloads in accordance with one or more embodiments described herein. As shown, the system 1300 can, in some cases, comprise the same components as the system 600, and can further comprise a set of threshold distributions 1302.

In various embodiments, the execution component 120 can electronically access, in any suitable fashion and/or from any suitable source, the set of threshold distributions 1302. In various aspects, the set of threshold distributions 1302 can be considered as representing a workload (e.g., as representing object size distributions of a workload, as representing interarrival time distributions of a workload) that the object store 104 was initially designed/configured to handle. In various instances, the execution component 120 can electronically compare (e.g., via statistical hypothesis tests) the set of distribution ensembles 604 to the set of threshold distributions 1302, and the execution component 120 can electronically recommend whether or not the object store 104 should undergo reconfiguration based on such comparison.

For example, if the set of distribution ensembles 604 satisfy (e.g., are sufficiently similar to, as indicated by statistical hypothesis tests) the set of threshold distributions 1302, the execution component 120 can conclude that the workload of the object store 104 is sufficiently similar to that which the object store 104 was initially designed to handle. In such case, the execution component 120 can recommend against reconfiguring the object store 104 (e.g., the execution component 120 can electronically transmit such recommendation to any suitable computing device and/or can electronically render such recommendation on any suitable screen/monitor).

As another example, if the set of distribution ensembles 604 fail to satisfy (e.g., are not sufficiently similar to, as indicated by statistical hypothesis tests) the set of threshold distributions 1302, the execution component 120 can conclude that the workload of the object store 104 is not sufficiently similar to that which the object store 104 was initially designed to handle. In such case, the execution component 120 can recommend reconfiguring the object store 104 (e.g., the execution component 120 can electronically transmit such recommendation to any suitable computing device and/or can electronically render such recommendation on any suitable screen/monitor).

Figure 14:
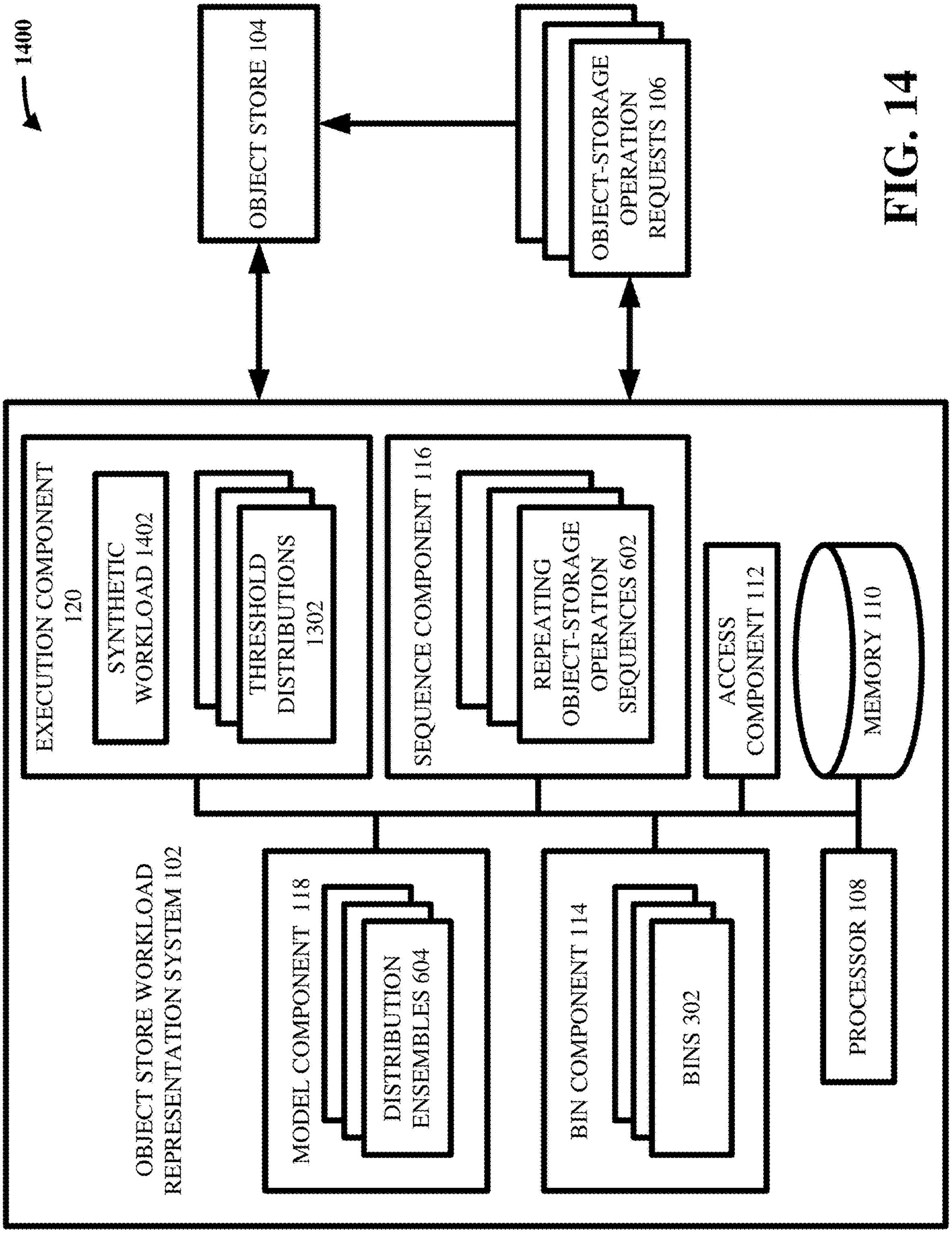
FIG. 14 illustrates a block diagram of an example, non-limiting system including a synthetic workload that facilitates compact representation of object store workloads in accordance with one or more embodiments described herein.

FIG. 14 illustrates a block diagram of an example, non-limiting system 1400 including a synthetic workload that can facilitate compact representation of object store workloads in accordance with one or more embodiments described herein. As shown, the system 1400 can, in some cases, comprise the same components as the system 1300, and can further comprise a synthetic workload 1402.

In various embodiments, the execution component 120 can electronically generate and/or synthesize the synthetic workload 1402 based on the set of distribution ensembles 604. In various instances, the synthetic workload 1402 can be any suitable set and/or stream of object-storage operation requests and/or sequences of object-storage operation requests whose object sizes and/or interarrival times mirror those depicted by the set of distribution ensembles 604. Accordingly, in various cases, the execution component 120 can electronically troubleshoot the object store 104 based on the synthetic workload 1402 (e.g., by exposing and/or subjecting the object store 104 to the synthetic workload 1402).

FIG. 15 illustrates a flow diagram of an example, non-limiting computer-implemented method 1500 that can facilitate compact representation of object store workloads in accordance with one or more embodiments described herein. In various cases, the object store workload representation system 102 can facilitate the computer-implemented method 1500.

In various embodiments, act 1502 can include accessing, by a device (e.g., via 112) operatively coupled to a processor, a stream of object-storage operation requests (e.g., 106) associated with an object store (e.g., 104).

In various aspects, act 1504 can include identifying, by the device (e.g., via 116), a set of repeating object-storage operation sequences (e.g., 602) within the stream of object-storage operation requests.

In various instances, act 1506 can include generating, by the device (e.g., via 118), a set of distribution ensembles (e.g., 604) that describe how first attributes (e.g., object size, interarrival times) of the set of repeating object-storage operation sequences vary. In various cases, the set of distribution ensembles can take up less memory space than the stream of object-storage operation requests and can collectively represent a workload of the object store.

Although not explicitly shown in FIG. 15, the computer-implemented method 1500 can further include: segmenting, by the device (e.g., via 114), the stream of object-storage operation requests into a set of bins (e.g., 302), based on second attributes (e.g., timestamp, bucket identifier, tenant identifier) associated with respective ones of the stream of object-storage operation requests. In various cases, both the identifying the set of repeating object-storage operation sequences and the generating the set of distribution ensembles can be performed on a bin-wise basis.

Although not explicitly shown in FIG. 15, the computer-implemented method 1500 can further include: comparing, by the device (e.g., via 120), the set of distribution ensembles to a threshold distribution (e.g., 1302), and recommending, by the device (e.g., via 120), whether to reconfigure the object store based on such comparison.

Although not explicitly shown in FIG. 15, the computer-implemented method 1500 can further include: troubleshooting, by the device (e.g., via 120), the object store with a synthetic workload (e.g., 1402), wherein the synthetic workload can be created based on the set of distribution ensembles.

Accordingly, various embodiments described herein can include a computerized tool that can facilitate compact representation of object store workloads. In particular, such computerized tool can access a stream of object-storage operation requests directed to an object store, can identify a set of repeating object-storage operation sequences within the stream, and can generate a set of distribution ensembles that convey how object sizes and/or interarrival times vary throughout the set of repeating object-storage operation sequences. In various cases, the set of distribution ensembles can be considered as a lightweight and/or compact representation of the workload of the object store. Accordingly, decisions regarding the object store (e.g., whether to be reconfigured) can be made on the basis of the set of distribution ensembles, rather than on the massive, voluminous, and seemingly chaotic stream of object-storage operation requests. Such a computerized tool certainly constitutes a useful and practical application of computers.

In various instances, machine learning algorithms and/or models can be implemented in any suitable way to facilitate any suitable aspects described herein. To facilitate some of the above-described machine learning aspects of various embodiments of the subject innovation, consider the following discussion of artificial intelligence (AI). Various embodiments of the present innovation herein can employ artificial intelligence to facilitate automating one or more features of the present innovation. The components can employ various AI-based schemes for carrying out various embodiments/examples disclosed herein. In order to provide for or aid in the numerous determinations (e.g., determine, ascertain, infer, calculate, predict, prognose, estimate, derive, forecast, detect, compute) of the present innovation, components of the present innovation can examine the entirety or a subset of the data to which it is granted access and can provide for reasoning about or determine states of the system and/or environment from a set of observations as captured via events and/or data. Determinations can be employed to identify a specific context or action, or can generate a probability distribution over states, for example. The determinations can be probabilistic; that is, the computation of a probability distribution over states of interest based on a consideration of data and events. Determinations can also refer to techniques employed for composing higher-level events from a set of events and/or data.

Such determinations can result in the construction of new events or actions from a set of observed events and/or stored event data, whether or not the events are correlated in close temporal proximity, and whether the events and data come from one or several event and data sources. Components disclosed herein can employ various classification (explicitly trained (e.g., via training data) as well as implicitly trained (e.g., via observing behavior, preferences, historical information, receiving extrinsic information, and so on)) schemes and/or systems (e.g., support vector machines, neural networks, expert systems, Bayesian belief networks, fuzzy logic, data fusion engines, and so on) in connection with performing automatic and/or determined action in connection with the claimed subject matter. Thus, classification schemes and/or systems can be used to automatically learn and perform a number of functions, actions, and/or determinations.

A classifier can map an input attribute vector, $z=(z_1, z_2, z_3, z_4, z_n)$, to a confidence that the input belongs to a class, as by f(z)=confidence(class). Such classification can employ a probabilistic and/or statistical-based analysis (e.g., factoring into the analysis utilities and costs) to determinate an action to be automatically performed. A support vector machine (SVM) can be an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and/or probabilistic classification models providing different patterns of independence, any of which can be employed. Classification as used herein also is inclusive of statistical regression that is utilized to develop models of priority.

Those having ordinary skill in the art will appreciate that the herein disclosure describes non-limiting examples of various embodiments of the subject innovation. For ease of description and/or explanation, various portions of the herein disclosure utilize the term "each" when discussing various embodiments of the subject innovation. Those having ordinary skill in the art will appreciate that such usages of the term "each" are non-limiting examples. In other words, when the herein disclosure provides a description that is applied to "each" of some particular object and/or component, it should be understood that this is a non-limiting example of various embodiments of the subject innovation, and it should be further understood that, in various other embodiments of the subject innovation, it can be the case that such description applies to fewer than "each" of that particular object and/or component.

Figure 16:
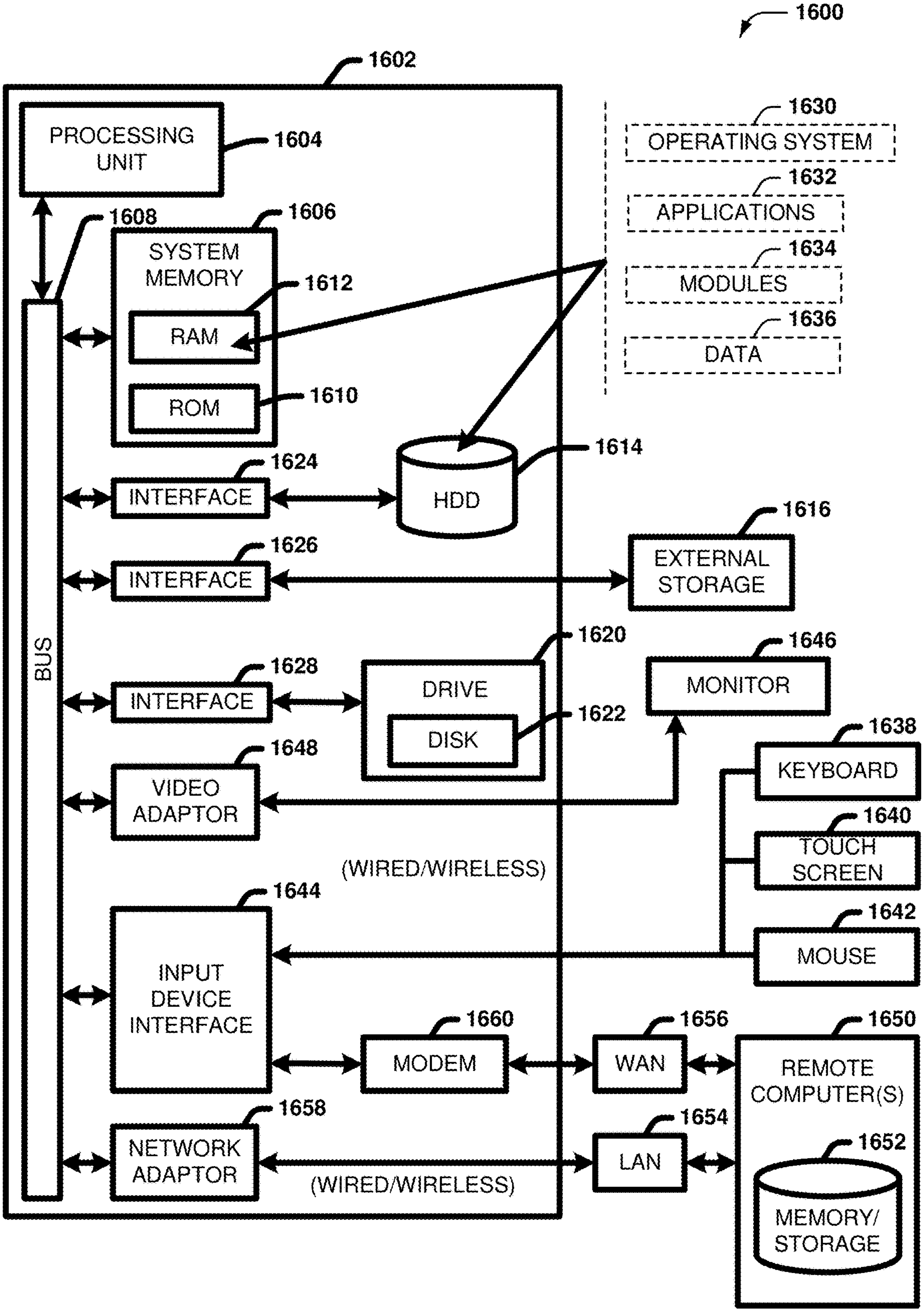
FIG. 16 illustrates a block diagram of an example, non-limiting operating environment in which one or more embodiments described herein can be facilitated.

In order to provide additional context for various embodiments described herein, FIG. 16 and the following discussion are intended to provide a brief, general description of a suitable computing environment 1600 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multi-processor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 16, the example environment 1600 for implementing various embodiments of the aspects described herein includes a computer 1602, the computer 1602 including a processing unit 1604, a system memory 1606 and a system bus 1608. The system bus 1608 couples system components including, but not limited to, the system memory 1606 to the processing unit 1604. The processing unit 1604 can be any of various commercially available processors. Dual microprocessors and other multi-processor architectures can also be employed as the processing unit 1604.

The system bus 1608 can be any of several types of bus structure that can further interconnect to a memory bus (with or without a memory controller), a peripheral bus, and a local bus using any of a variety of commercially available bus architectures. The system memory 1606 includes ROM 1610 and RAM 1612. A basic input/output system (BIOS) can be stored in a non-volatile memory such as ROM, erasable programmable read only memory (EPROM), EEPROM, which BIOS contains the basic routines that help to transfer information between elements within the computer 1602, such as during startup. The RAM 1612 can also include a high-speed RAM such as static RAM for caching data.

The computer 1602 further includes an internal hard disk drive (HDD) 1614 (e.g., EIDE, SATA), one or more external storage devices 1616 (e.g., a magnetic floppy disk drive (FDD) 1616, a memory stick or flash drive reader, a memory card reader, etc.) and a drive 1620, e.g., such as a solid state drive, an optical disk drive, which can read or write from a disk 1622, such as a CD-ROM disc, a DVD, a BD, etc. Alternatively, where a solid state drive is involved, disk 1622 would not be included, unless separate. While the internal HDD 1614 is illustrated as located within the computer 1602, the internal HDD 1614 can also be configured for external use in a suitable chassis (not shown). Additionally, while not shown in environment 1600, a solid state drive (SSD) could be used in addition to, or in place of, an HDD 1614. The HDD 1614, external storage device(s) 1616 and drive 1620 can be connected to the system bus 1608 by an HDD interface 1624, an external storage interface 1626 and a drive interface 1628, respectively. The interface 1624 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1602, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1612, including an operating system 1630, one or more application programs 1632, other program modules 1634 and program data 1636. All or portions of the operating system, applications, modules, and/or data can also be cached in the RAM 1612. The systems and methods described herein can be implemented utilizing various commercially available operating systems or combinations of operating systems.

Computer 1602 can optionally comprise emulation technologies. For example, a hypervisor (not shown) or other intermediary can emulate a hardware environment for operating system 1630, and the emulated hardware can optionally be different from the hardware illustrated in FIG. 16. In such an embodiment, operating system 1630 can comprise one virtual machine (VM) of multiple VMs hosted at computer 1602. Furthermore, operating system 1630 can provide runtime environments, such as the Java runtime environment or the .NET framework, for applications 1632. Runtime environments are consistent execution environments that allow applications 1632 to run on any operating system that includes the runtime environment. Similarly, operating system 1630 can support containers, and applications 1632 can be in the form of containers, which are lightweight, standalone, executable packages of software that include, e.g., code, runtime, system tools, system libraries and settings for an application.

Further, computer 1602 can be enable with a security module, such as a trusted processing module (TPM). For instance with a TPM, boot components hash next in time boot components, and wait for a match of results to secured values, before loading a next boot component. This process can take place at any layer in the code execution stack of computer 1602, e.g., applied at the application execution level or at the operating system (OS) kernel level, thereby enabling security at any level of code execution.

A user can enter commands and information into the computer 1602 through one or more wired/wireless input devices, e.g., a keyboard 1638, a touch screen 1640, and a pointing device, such as a mouse 1642. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1604 through an input device interface 1644 that can be coupled to the system bus 1608, but can be connected by other interfaces, such as a parallel port, an IEEE 1394 serial port, a game port, a USB port, an IR interface, a BLUETOOTH® interface, etc.

A monitor 1646 or other type of display device can be also connected to the system bus 1608 via an interface, such as a video adapter 1648. In addition to the monitor 1646, a computer typically includes other peripheral output devices (not shown), such as speakers, printers, etc.

The computer 1602 can operate in a networked environment using logical connections via wired and/or wireless communications to one or more remote computers, such as a remote computer(s) 1650. The remote computer(s) 1650 can be a workstation, a server computer, a router, a personal computer, portable computer, microprocessor-based entertainment appliance, a peer device or other common network node, and typically includes many or all of the elements described relative to the computer 1602, although, for purposes of brevity, only a memory/storage device 1652 is illustrated. The logical connections depicted include wired/wireless connectivity to a local area network (LAN) 1654 and/or larger networks, e.g., a wide area network (WAN) 1656. Such LAN and WAN networking environments are commonplace in offices and companies, and facilitate enterprise-wide computer networks, such as intranets, all of which can connect to a global communications network, e.g., the Internet.

When used in a LAN networking environment, the computer 1602 can be connected to the local network 1654 through a wired and/or wireless communication network interface or adapter 1658. The adapter 1658 can facilitate wired or wireless communication to the LAN 1654, which can also include a wireless access point (AP) disposed thereon for communicating with the adapter 1658 in a wireless mode.

When used in a WAN networking environment, the computer 1602 can include a modem 1660 or can be connected to a communications server on the WAN 1656 via other means for establishing communications over the WAN 1656, such as by way of the Internet. The modem 1660, which can be internal or external and a wired or wireless device, can be connected to the system bus 1608 via the input device interface 1644. In a networked environment, program modules depicted relative to the computer 1602 or portions thereof, can be stored in the remote memory/storage device 1652. It will be appreciated that the network connections shown are example and other means of establishing a communications link between the computers can be used.

When used in either a LAN or WAN networking environment, the computer 1602 can access cloud storage systems or other network-based storage systems in addition to, or in place of, external storage devices 1616 as described above, such as but not limited to a network virtual machine providing one or more aspects of storage or processing of information. Generally, a connection between the computer 1602 and a cloud storage system can be established over a LAN 1654 or WAN 1656 e.g., by the adapter 1658 or modem 1660, respectively. Upon connecting the computer 1602 to an associated cloud storage system, the external storage interface 1626 can, with the aid of the adapter 1658 and/or modem 1660, manage storage provided by the cloud storage system as it would other types of external storage. For instance, the external storage interface 1626 can be configured to provide access to cloud storage sources as if those sources were physically connected to the computer 1602.

The computer 1602 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Figure 17:
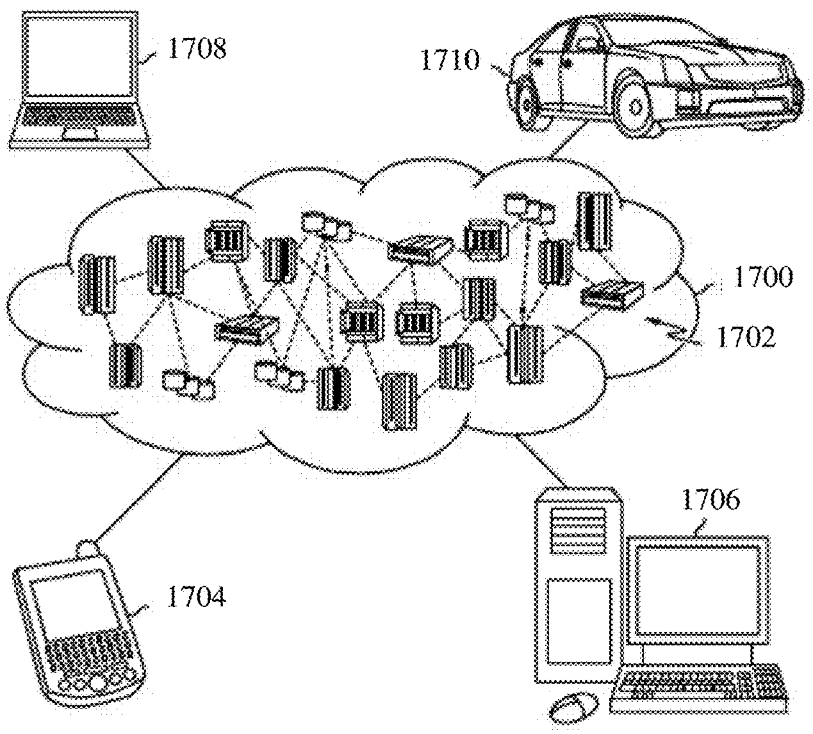
FIG. 17 illustrates an example, non-limiting cloud computing environment in accordance with one or more embodiments described herein.

Referring now to FIG. 17, illustrative cloud computing environment 1700 is depicted. As shown, cloud computing environment 1700 includes one or more cloud computing nodes 1702 with which local computing devices used by cloud consumers, such as, for example, personal digital assistant (PDA) or cellular telephone 1704, desktop computer 1706, laptop computer 1708, and/or automobile computer system 1710 may communicate. Nodes 1702 may communicate with one another. They may be grouped (not shown) physically or virtually, in one or more networks, such as Private, Community, Public, or Hybrid clouds as described hereinabove, or a combination thereof. This allows cloud computing environment 1700 to offer infrastructure, platforms and/or software as services for which a cloud consumer does not need to maintain resources on a local computing device. It is understood that the types of computing devices 1704-1710 shown in FIG. 17 are intended to be illustrative only and that computing nodes 1702 and cloud computing environment 1700 can communicate with any type of computerized device over any type of network and/or network addressable connection (e.g., using a web browser).

Figure 18:
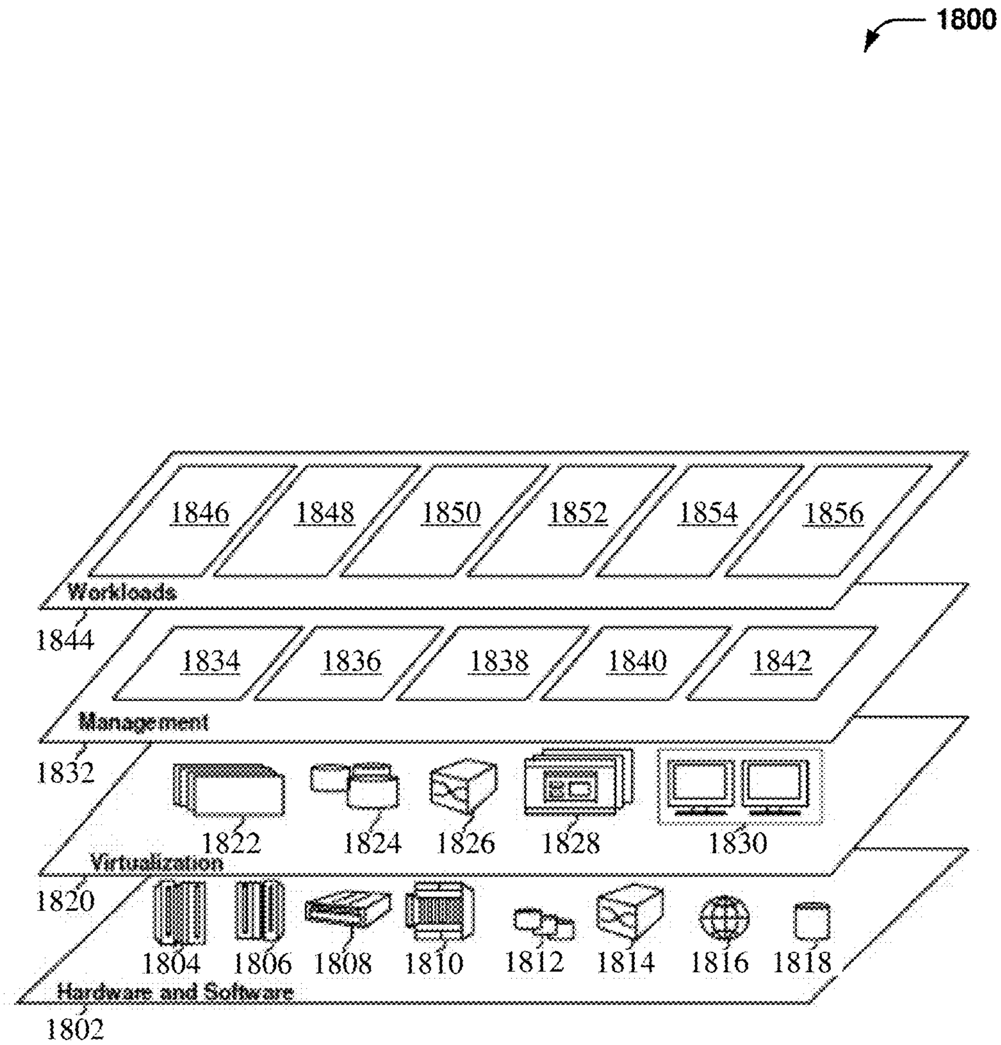
FIG. 18 illustrates example, non-limiting abstraction model layers in accordance with one or more embodiments described herein.

Referring now to FIG. 18, a set of functional abstraction layers provided by cloud computing environment 1700 (FIG. 17) is shown. Repetitive description of like elements employed in other embodiments described herein is omitted for sake of brevity. It should be understood in advance that the components, layers, and functions shown in FIG. 18 are intended to be illustrative only and embodiments of the invention are not limited thereto. As depicted, the following layers and corresponding functions are provided.

Hardware and software layer 1802 includes hardware and software components. Examples of hardware components include: mainframes 1804; RISC (Reduced Instruction Set Computer) architecture based servers 1806; servers 1808; blade servers 1810; storage devices 1812; and networks and networking components 1814. In some embodiments, software components include network application server software 1816 and database software 1818.

Virtualization layer 1820 provides an abstraction layer from which the following examples of virtual entities may be provided: virtual servers 1822; virtual storage 1824; virtual networks 1826, including virtual private networks; virtual applications and operating systems 1828; and virtual clients 1830.

In one example, management layer 1832 may provide the functions described below. Resource provisioning 1834 provides dynamic procurement of computing resources and other resources that are utilized to perform tasks within the cloud computing environment. Metering and Pricing 1836 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1838 provides access to the cloud computing environment for consumers and system administrators. Service level management 1840 provides cloud computing resource allocation and management such that required service levels are met. Service Level Agreement (SLA) planning and fulfillment 1842 provide pre-arrangement for, and procurement of, cloud computing resources for which a future requirement is anticipated in accordance with an SLA.

Workloads layer 1844 provides examples of functionality for which the cloud computing environment may be utilized. Examples of workloads and functions which may be provided from this layer include: mapping and navigation 1846; software development and lifecycle management 1848; virtual classroom education delivery 1850; data analytics processing 1852; transaction processing 1854; and differentially private federated learning processing 1856. Various embodiments described herein can utilize the cloud computing environment described with reference to FIGS. 17 and 18 to execute one or more differentially private federated learning process in accordance with various embodiments described herein.

Various embodiments described herein may be a system, a method, an apparatus and/or a computer program product at any possible technical detail level of integration. The computer program product can include a computer readable storage medium (or media) having computer readable program instructions thereon for causing a processor to carry out aspects of various embodiments described herein. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adaptor card or network interface in each computing/processing device receives computer readable program instructions from the network and forwards the computer readable program instructions for storage in a computer readable storage medium within the respective computing/processing device.

Computer readable program instructions for carrying out operations of various embodiments described herein can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of various embodiments described herein.

Aspects of various embodiments are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments described herein. In this regard, each block in the flowchart or block diagrams can represent a module, segment, or portion of instructions, which comprises one or more executable instructions for implementing the specified logical function (s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, and/or data structures, that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:

a processor that executes computer-executable components stored in a computer-readable memory, the computer-executable components comprising:

an access component that accesses a stream of object-storage operation requests associated with an object store;

a bin component that segments the stream of object-storage operation requests into a set of bins, based on first attributes of the stream of object-storage operation requests;

a sequence component that identifies a set of repeating object-storage operation sequences for at least one bin in the set of bins, based on the stream of object-storage operation requests in a bin-wise fashion, wherein identifying the set of repeating object-storage operation sequences comprises:

for each bin in the set of bins, selecting an object-storage operation request that has not been assigned to a repeating object-storage operation sequence for that bin and has an object identifier; and for each bin in the set of bins, creating a new repeating object-storage operation sequence for that bin that corresponds to the object identifier or replacing an existing repeating object-storage operation sequence with the new repeating object-storage operation sequence based on available memory slots;

a model component that generates a set of distribution ensembles for at least one bin in the set of bins that quantify variation of second attributes associated with respective ones of the set of repeating object-storage operation sequences in that bin; and an execution component that reconfigures the object store to handle a current workload based on the set of distribution ensembles.

2. The system of claim 1, wherein the execution component compares the set of distribution ensembles to at least one threshold distribution associated with the object store, and wherein the execution component recommends that the object store be reconfigured when the set of distribution ensembles fail to satisfy the at least one threshold distribution.

3. The system of claim 1, wherein the second attributes include object sizes associated with repeating object-storage operation sequences or operation interarrival times associated with repeating object-storage operation sequences.

4. The system of claim 1, wherein the first attributes include time periods or dates associated with object-storage operation requests, bucket identifiers associated with object-storage operation requests, or tenant identifiers associated with object-storage operation requests.

5. The system of claim 1, wherein the sequence component identifies the set of repeating object-storage operation sequences by performing regex matching on the stream of object-storage operation requests.

6. The system of claim 1, wherein the computer-executable components further comprise:

an execution component that generates a synthetic workload based on the set of distribution ensembles and that troubleshoots the object store with the synthetic workload.

7. The system of claim 1, wherein replacing the existing repeating object-storage operation sequence comprises:

selecting, in response to no available memory slots, two distribution ensembles; and merging the two distribution ensembles; and creating a distribution ensemble that corresponds to a repeating object-storage operation sequence that replaces the existing repeating object-storage operation sequence.

8. A computer-implemented method, comprising:

accessing, by a device operatively coupled to a processor, a stream of object-storage operation requests received by an object store from one or more client devices;

segmenting, by the device, the stream of object-storage operation requests into a set of bins, based on first attributes associated with the stream of object-storage operation requests;

identifying, by the device, a set of repeating object-storage operation sequences within the stream of object-storage operation requests for at least one bin in the set of bins in a bin-wise fashion, wherein identifying the set of repeating object-storage operation sequences comprises:

for each bin in the set of bins, selecting an object-storage operation request that has not been assigned to a repeating object-storage operation sequence for that bin and has an object identifier; and for each bin in the set of bins, creating a new repeating object-storage operation sequence that corresponds to the object identifier or replacing an existing repeating object-storage operation sequence with the new repeating object-storage operation sequence based on available memory slots;

generating, by the device, a set of distribution ensembles for at least one bin in the set of bins that describe how second attributes associated with respective ones of the set of repeating object-storage operation sequences in that bin vary, wherein the set of distribution ensembles collectively represent a current workload of the object store; and reconfiguring, by the device, the object store to handle the current workload based on the set of distribution ensembles.

9. The computer-implemented method of claim 8, further comprising:

determining, by the device, that the set of distribution ensembles fail to satisfy at least one threshold distribution; and recommending, by the device, that the object store should undergo reconfiguration.

10. The computer-implemented method of claim 8, wherein the second attributes include object sizes associated with repeating object-storage operation sequences and operation interarrival times associated with repeating object-storage operation sequences.

11. The computer-implemented method of claim 8, wherein the first attributes include time periods or dates associated with object-storage operation requests, bucket identifiers associated with object-storage operation requests, and tenant identifiers associated with object-storage operation requests.

12. The computer-implemented method of claim 8, wherein the identifying the set of repeating object-storage operation sequences includes performing, by the device, object-identifier regex matching on the stream of object-storage operation requests.

13. The computer-implemented method of claim 8, further comprising:

troubleshooting, by the device, the object store with a synthetic workload, wherein the synthetic workload is created based on the set of distribution ensembles.

14. The computer-implemented method of claim 8, wherein replacing the existing repeating object-storage operation sequence comprises:

selecting, in response to no available memory slots, two distribution ensembles; and merging the two distribution ensembles; and creating a distribution ensemble that corresponds to a repeating object-storage operation sequence that replaces the existing repeating object-storage operation sequence.

15. A computer program product for facilitating compact representation of object store workloads, the computer program product comprising a non-transitory computer-readable memory having program instructions embodied therewith, the program instructions executable by a processor to cause the processor to:

access a stream of object-storage operation requests of an object store;

segment the stream of object-storage operation requests into a set of bins, based on first attributes of the stream of object-storage operation requests;

identify, for at least one bin in the set of bins, a set of repeating object-storage operation sequences within the stream of object-storage operation requests for the object-storage operations requests in a bin-wise fashion, wherein identifying the set of repeating object-storage operation sequences comprises:

for each bin in the set of bins, selecting an object-storage operation request that has not been assigned to a repeating object-storage operation sequence for that bin and has an object identifier; and for each bin in the set of bins, creating a new repeating object-storage operation sequence that corresponds to the object identifier or replacing an existing repeating object-storage operation sequence with the new repeating object-storage operation sequence based on available memory slots;

generate, for at least one bin in the set of bins, a set of distribution ensembles conveying how second attributes of the set of repeating object-storage operation sequences in that bin vary, wherein the set of distribution ensembles collectively represent a current workload of the object store, and wherein the set of distribution ensembles take up less memory than the stream of object-storage operation requests; and reconfigure the object store to handle the current workload based on the set of distribution ensembles.

16. The computer program product of claim 15, wherein the program instructions are further executable to cause the processor to:

compare the set of distribution ensembles to one or more threshold distributions; and recommend whether the object store should be reconfigured, based on the comparison.

17. The computer program product of claim 15, wherein the program instructions are further executable to cause the processor to:

generate a synthetic workload based on the set of distribution ensembles; and troubleshoot the object store with the synthetic workload.

18. The computer program product of claim 15, wherein:

the first attributes include time periods or dates associated with object-storage operation requests, bucket identifiers associated with object-storage operation requests, and tenant identifiers associated with object-storage operation requests, and the second attributes include object sizes associated with repeating object-storage operation sequences and operation interarrival times associated with repeating object-storage operation sequences.

* * * * *